(12) United States Patent
Gilliland et al.

(10) Patent No.: US 10,732,283 B2
(45) Date of Patent: Aug. 4, 2020

(54) LADAR SENSOR FOR LANDING, DOCKING AND APPROACH

(71) Applicant: Continental Advanced Lidar Solutions US, LLC, Carpinteria, CA (US)

(72) Inventors: Patrick Gilliland, Santa Barbara, CA (US); Robert W Koseluck, Santa Barbara, CA (US); Steve Penniman, Goleta, CA (US); Brad Short, Goleta, CA (US); Joseph Spagnolia, Ventura, CA (US); Roger Stettner, Santa Barbara, CA (US)

(73) Assignee: Continental Advanced Lidar Solutions US, LLC, Carpinteria, CA (US)

( * ) Notice: Subject to any disclaimer, the term of this patent is extended or adjusted under 35 U.S.C. 154(b) by 289 days.

(21) Appl. No.: 15/848,253

(22) Filed: Dec. 20, 2017

(65) Prior Publication Data

US 2018/0100925 A1    Apr. 12, 2018

Related U.S. Application Data

(63) Continuation of application No. 14/619,405, filed on Feb. 11, 2015, now Pat. No. 9,880,281, which is a
(Continued)

(51) Int. Cl.
*G01C 3/08* (2006.01)
*G01S 17/88* (2006.01)
(Continued)

(52) U.S. Cl.
CPC ............. *G01S 17/88* (2013.01); *B64D 39/00* (2013.01); *B64D 47/00* (2013.01); *B64G 1/646* (2013.01);
(Continued)

(58) Field of Classification Search
CPC .......... G01S 17/10; G01S 7/497; G01S 7/487; G01S 17/88; G01S 17/18; G01S 7/481; G01S 7/4863; G01S 7/4868; G01S 17/89; G01C 3/08; B64D 39/00; B64D 47/00; B64G 1/646
See application file for complete search history.

(56) References Cited

U.S. PATENT DOCUMENTS 6,100,964 A * 8/2000 De Cremiers .......... B64F 1/002
356/4.01
6,299,107 B1 * 10/2001 Kong ...................... B64G 1/646
244/172.4
(Continued)

*Primary Examiner* — Samantha K Abraham

(57) ABSTRACT

A system for landing or docking a mobile platform is enabled by a flash LADAR sensor having an adaptive controller with Automatic Gain Control (AGC). Range gating in the LADAR sensor penetrates through diffuse reflectors. The LADAR sensor adapted for landing/approach comprises a system controller, pulsed laser transmitter, transmit optics, receive optics, a focal plane array of detectors, a readout integrated circuit, camera support electronics and image processor, an image analysis and bias calculation processor, and a detector array bias control circuit. The system is capable of developing a complete 3-D scene from a single point of view.

18 Claims, 11 Drawing Sheets

Related U.S. Application Data continuation of application No. 13/447,717, filed on Apr. 16, 2012, now Pat. No. 8,976,340.

(60) Provisional application No. 61/475,955, filed on Apr. 15, 2011.

(51) Int. Cl.
| | | |
|---|---|---|
| *B64G 1/64* | (2006.01) | |
| *B64D 47/00* | (2006.01) | |
| *B64D 39/00* | (2006.01) | |
| *G01S 17/89* | (2020.01) | |
| *G01S 7/4863* | (2020.01) | |
| *G01S 7/486* | (2020.01) | |
| *G01S 7/481* | (2006.01) | |
| *G01S 17/18* | (2020.01) | |

(52) U.S. Cl.
CPC ............ *G01S 7/481* (2013.01); *G01S 7/4863* (2013.01); *G01S 7/4868* (2013.01); *G01S 17/18* (2020.01); *G01S 17/89* (2013.01)

(56) References Cited

U.S. PATENT DOCUMENTS

| | | | | |
|---|---|---|---|---|
| 6,603,865 B1 * | 8/2003 | Yagi | ............................ | G06T 7/70 |
| | | | | 382/103 |
| 6,741,841 B1 * | 5/2004 | Mitchell | ............ | H04B 7/18508 |
| | | | | 455/188.1 |
| 7,599,691 B1 * | 10/2009 | Mitchell | ................ | G06Q 30/02 |
| | | | | 455/431 |

\* cited by examiner

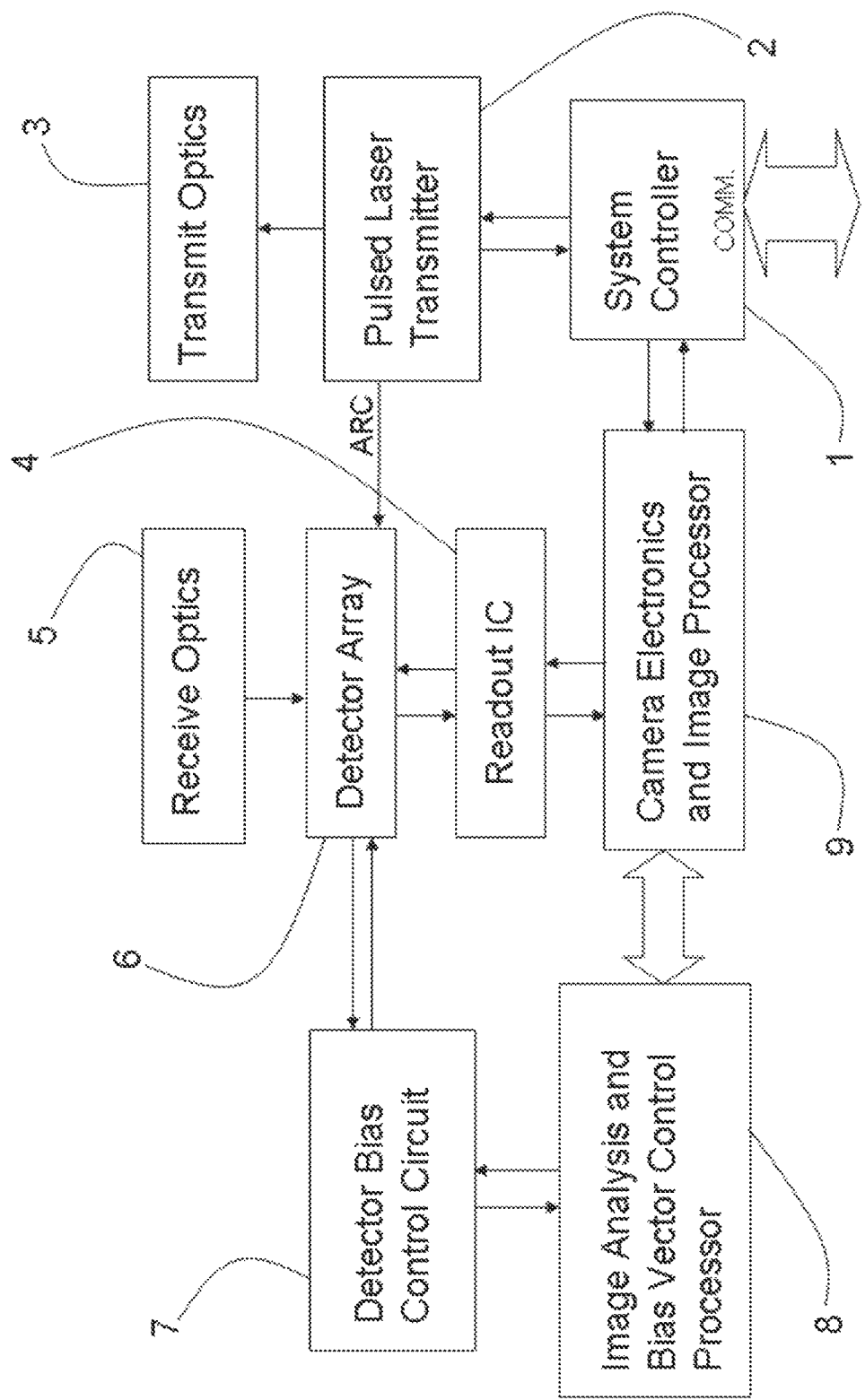
FIGURE 1. LADAR Sensor System Diagram

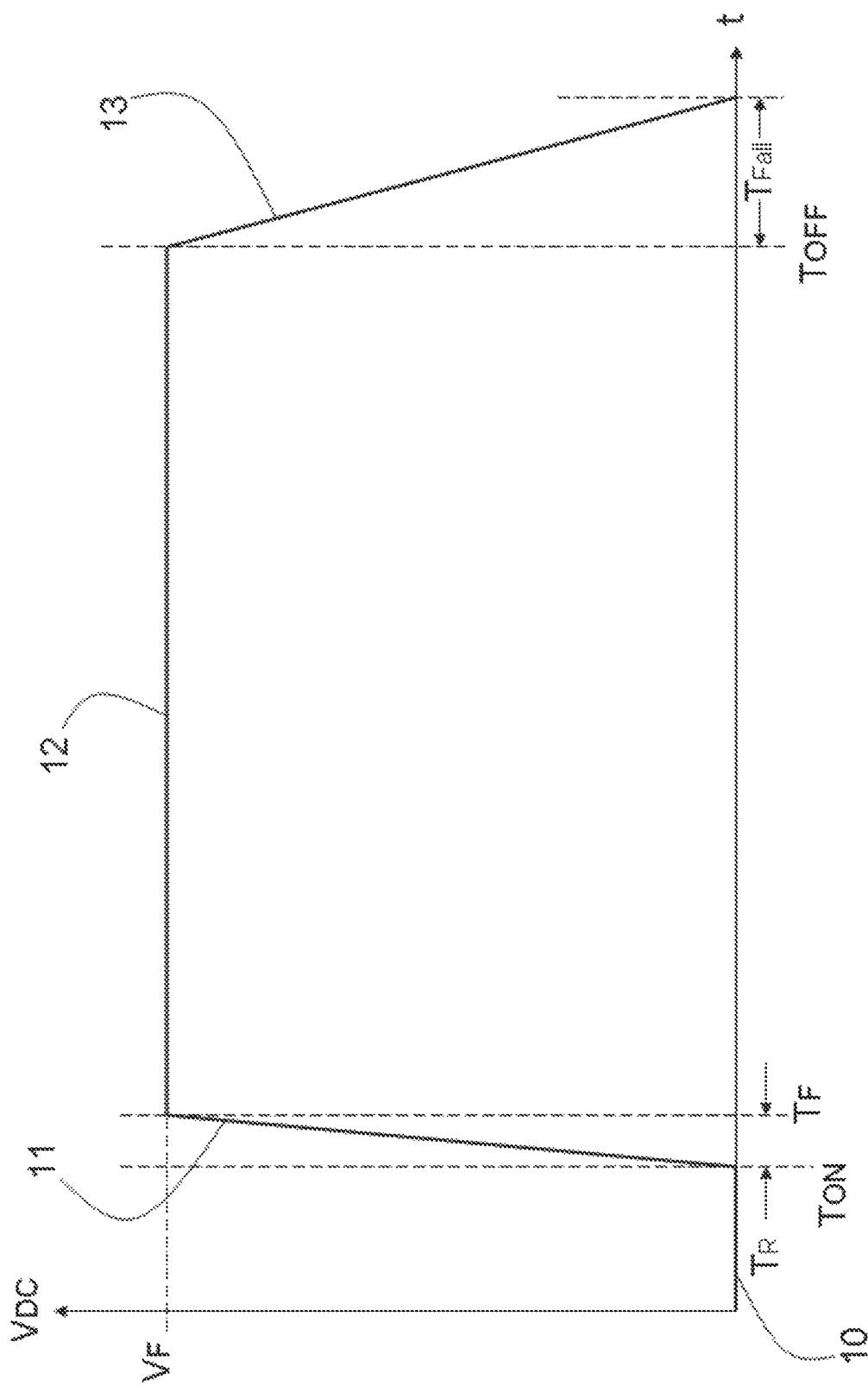

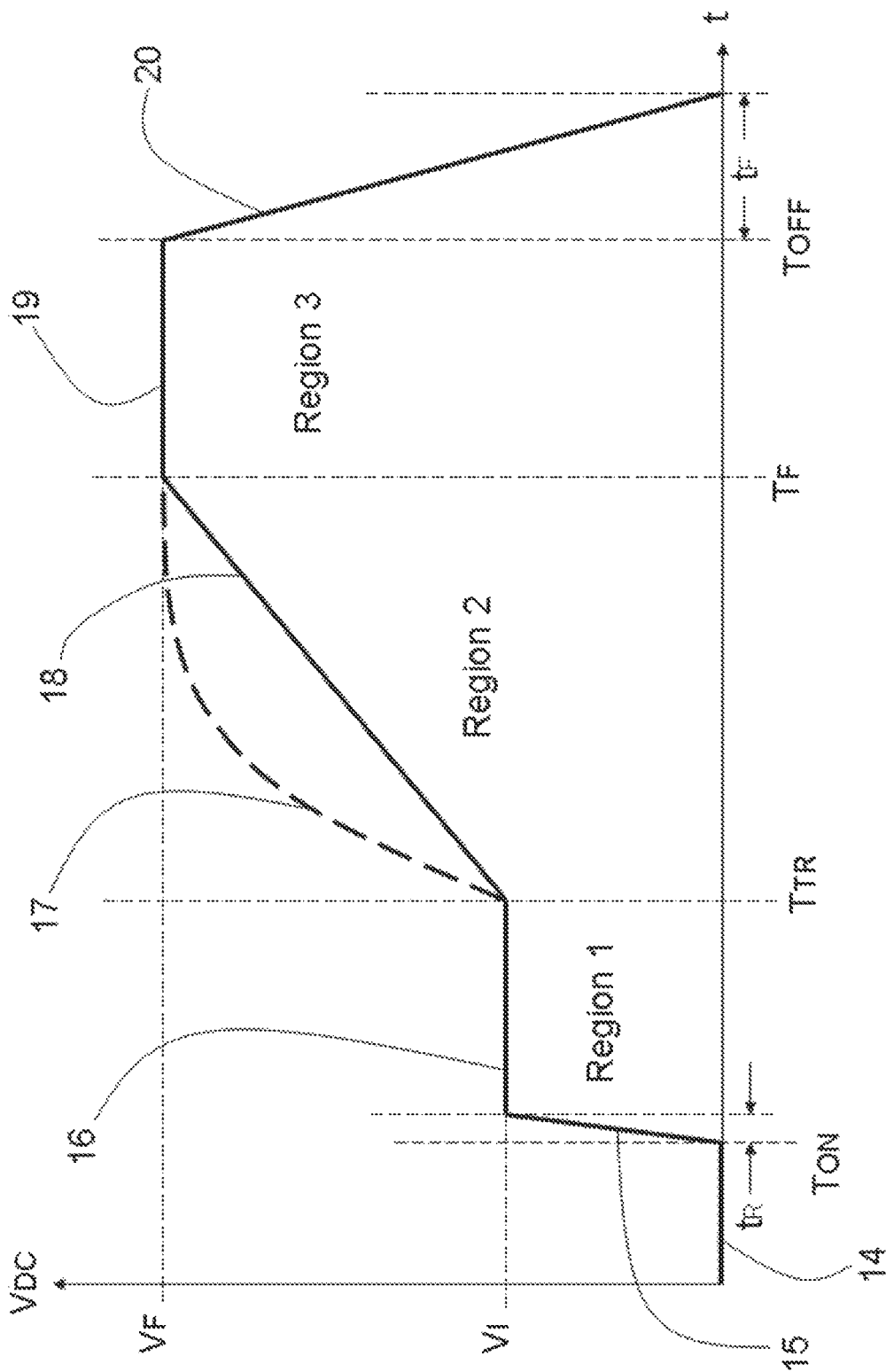

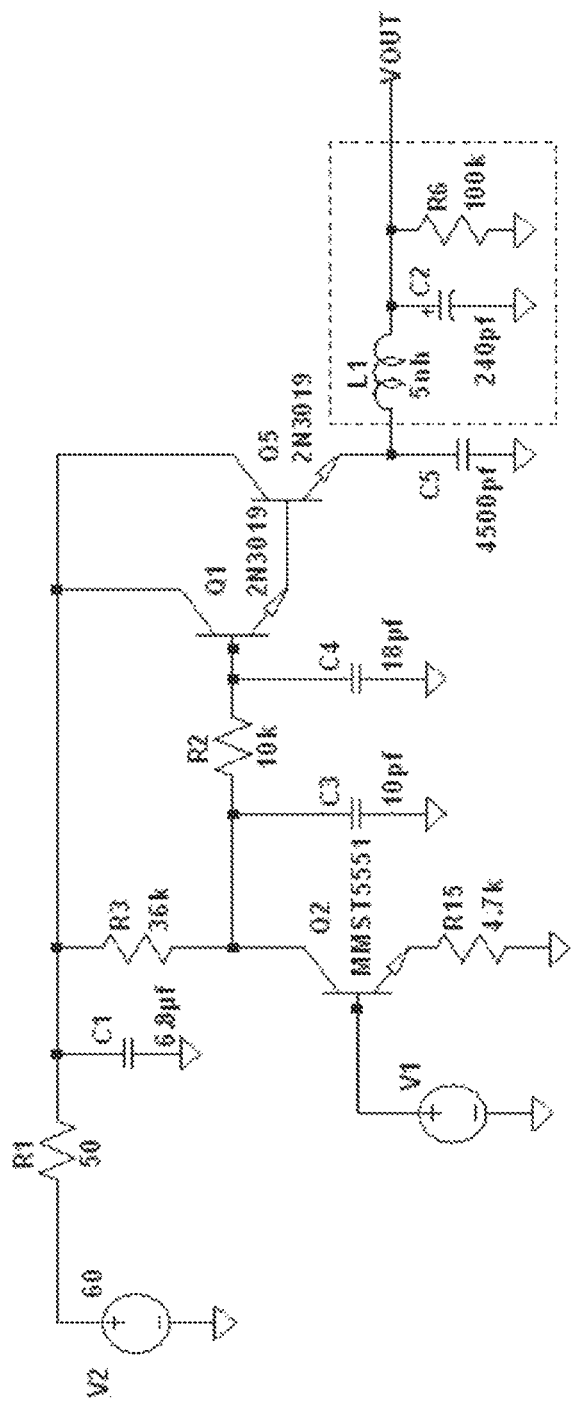
FIGURE 4. Detector Bias Control Circuit

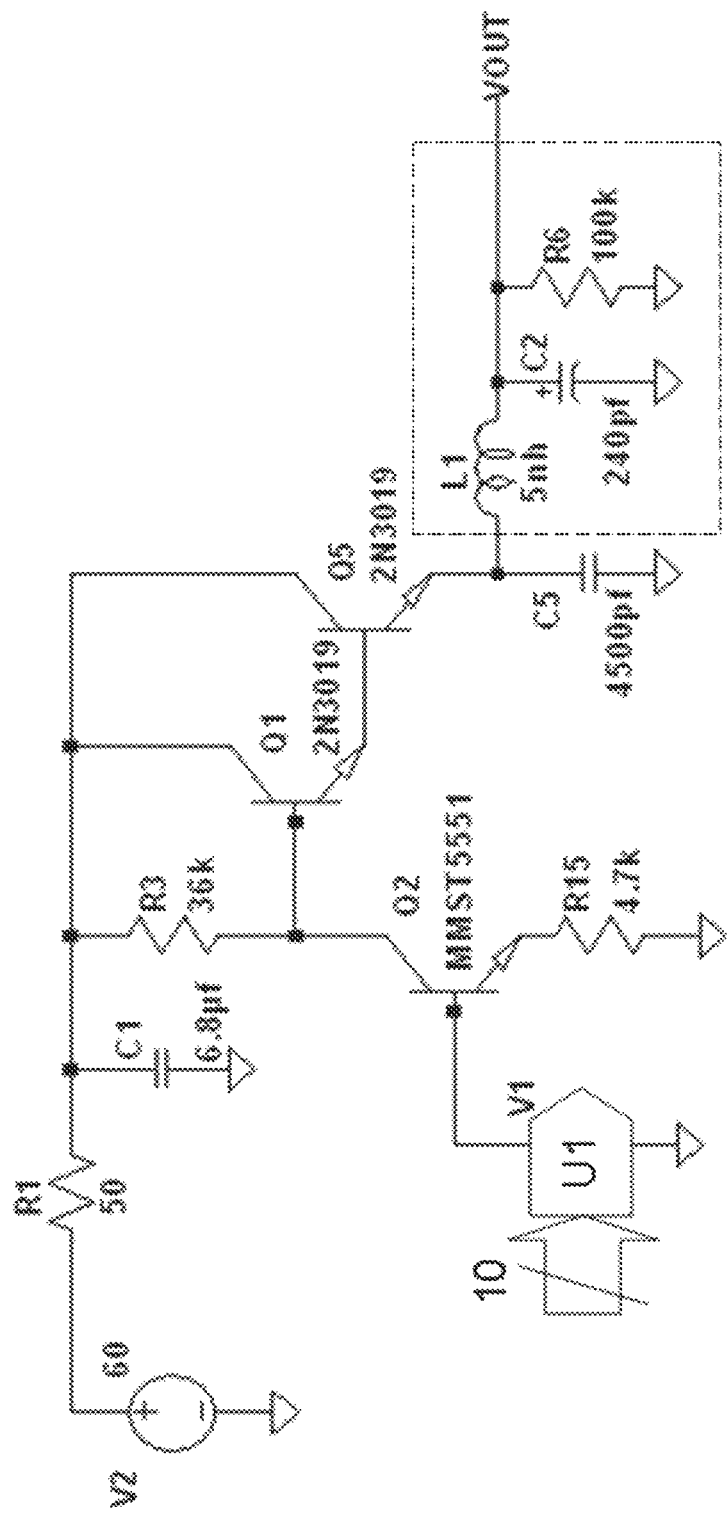
FIGURE 5. DAC Controlled Detector Bias Circuit

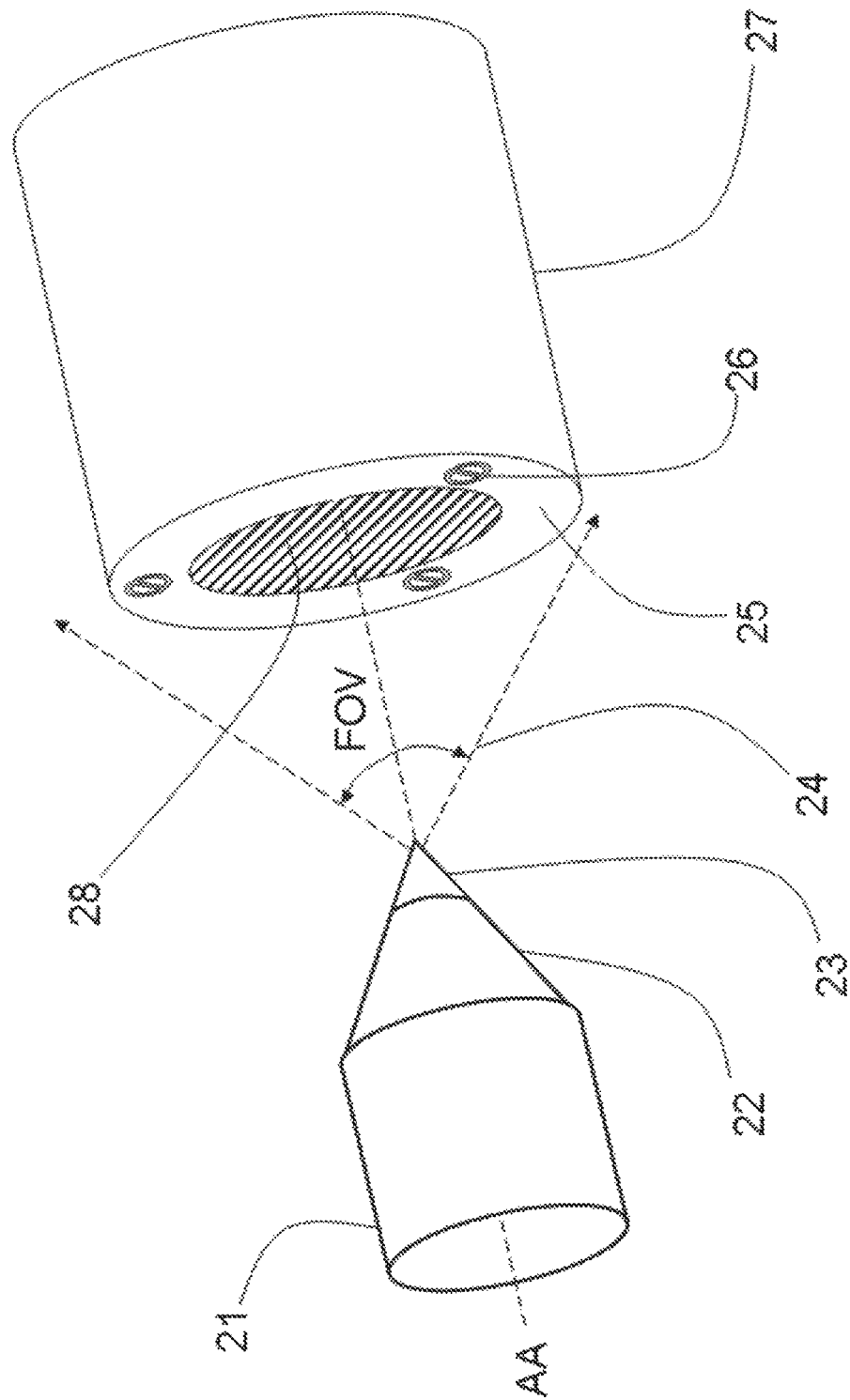

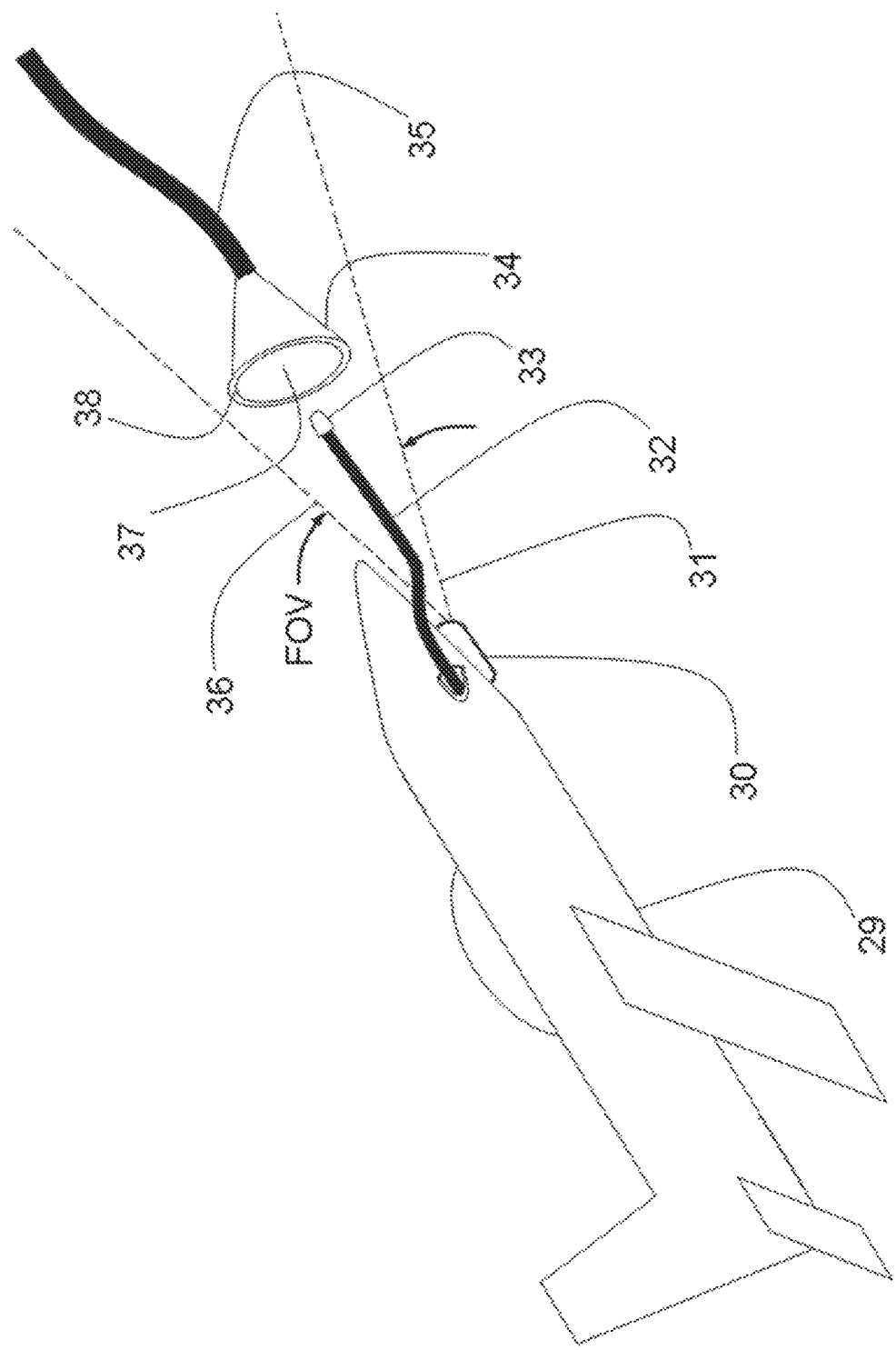
FIGURE 7. Aerial Refueling

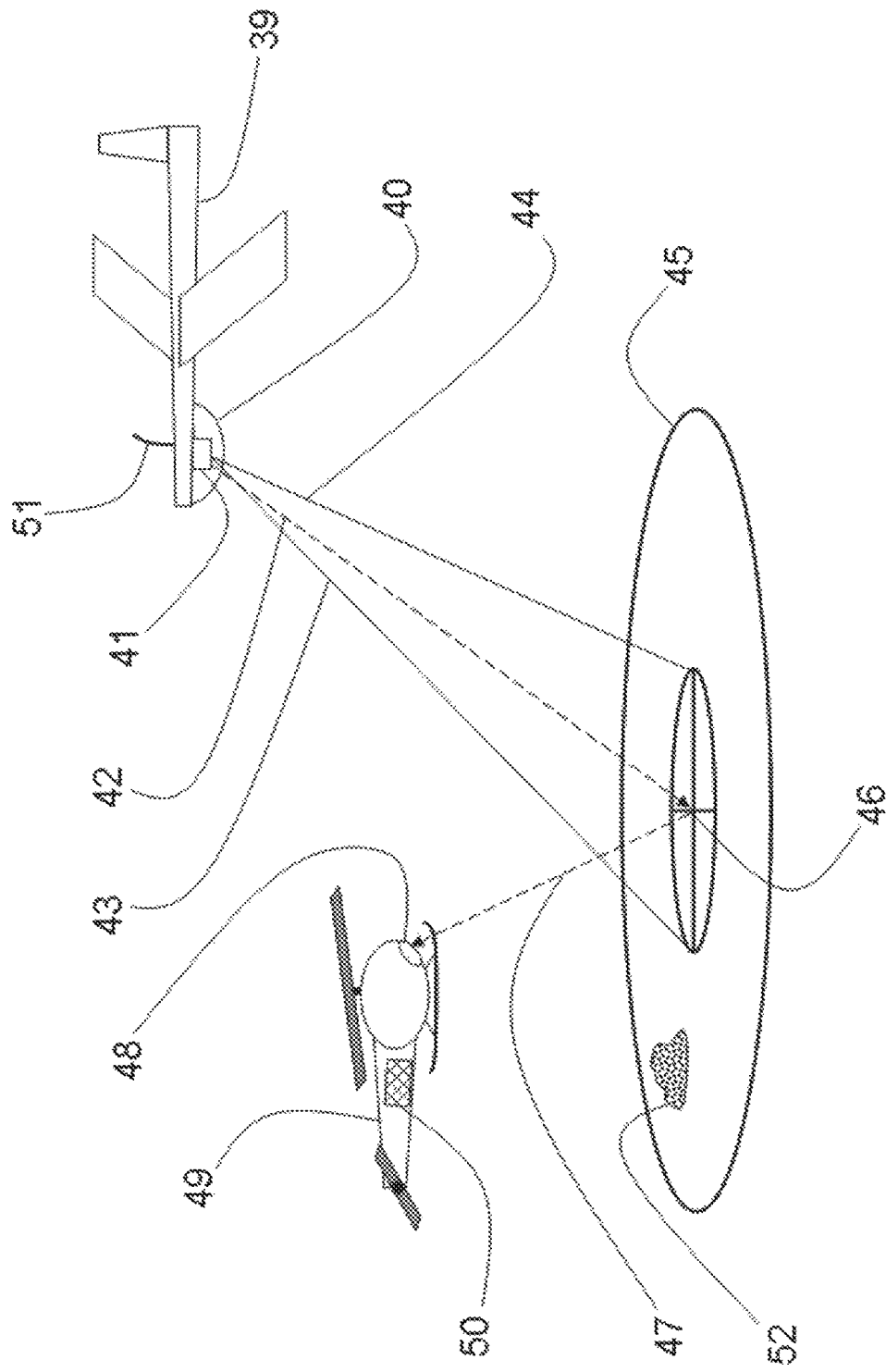
FIGURE 8. Landing System Designator

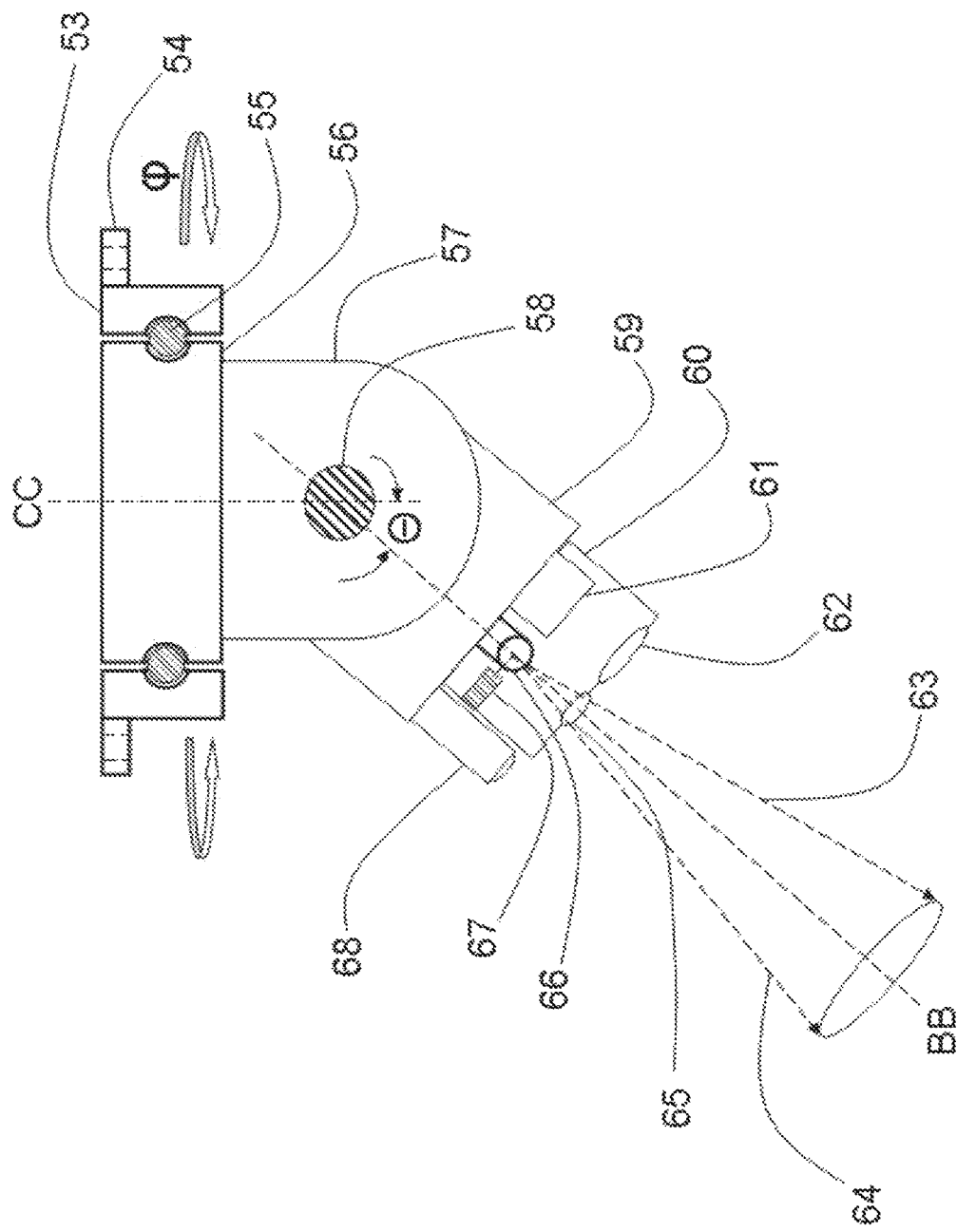

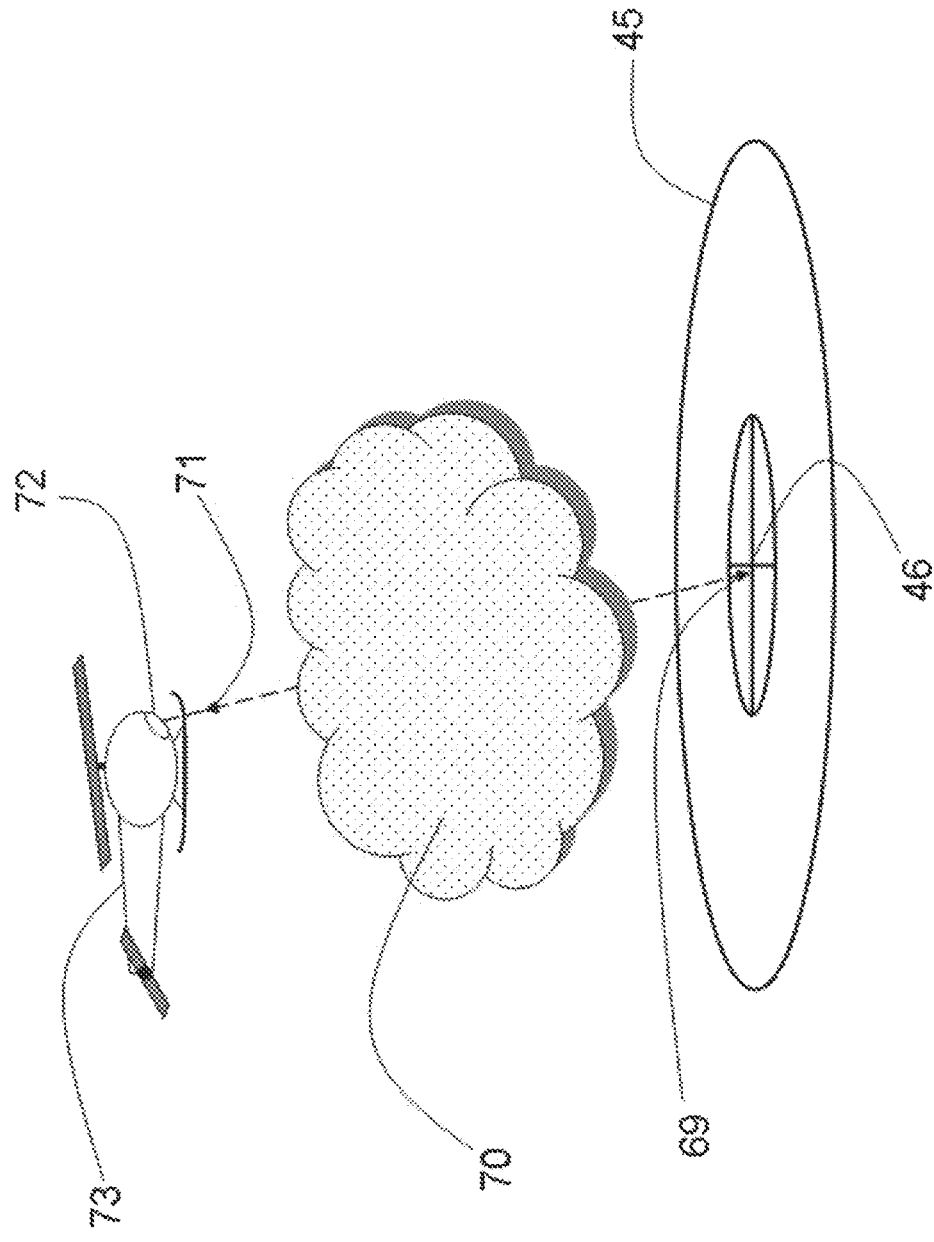
FIGURE 10. Helicopter Brownout Landing

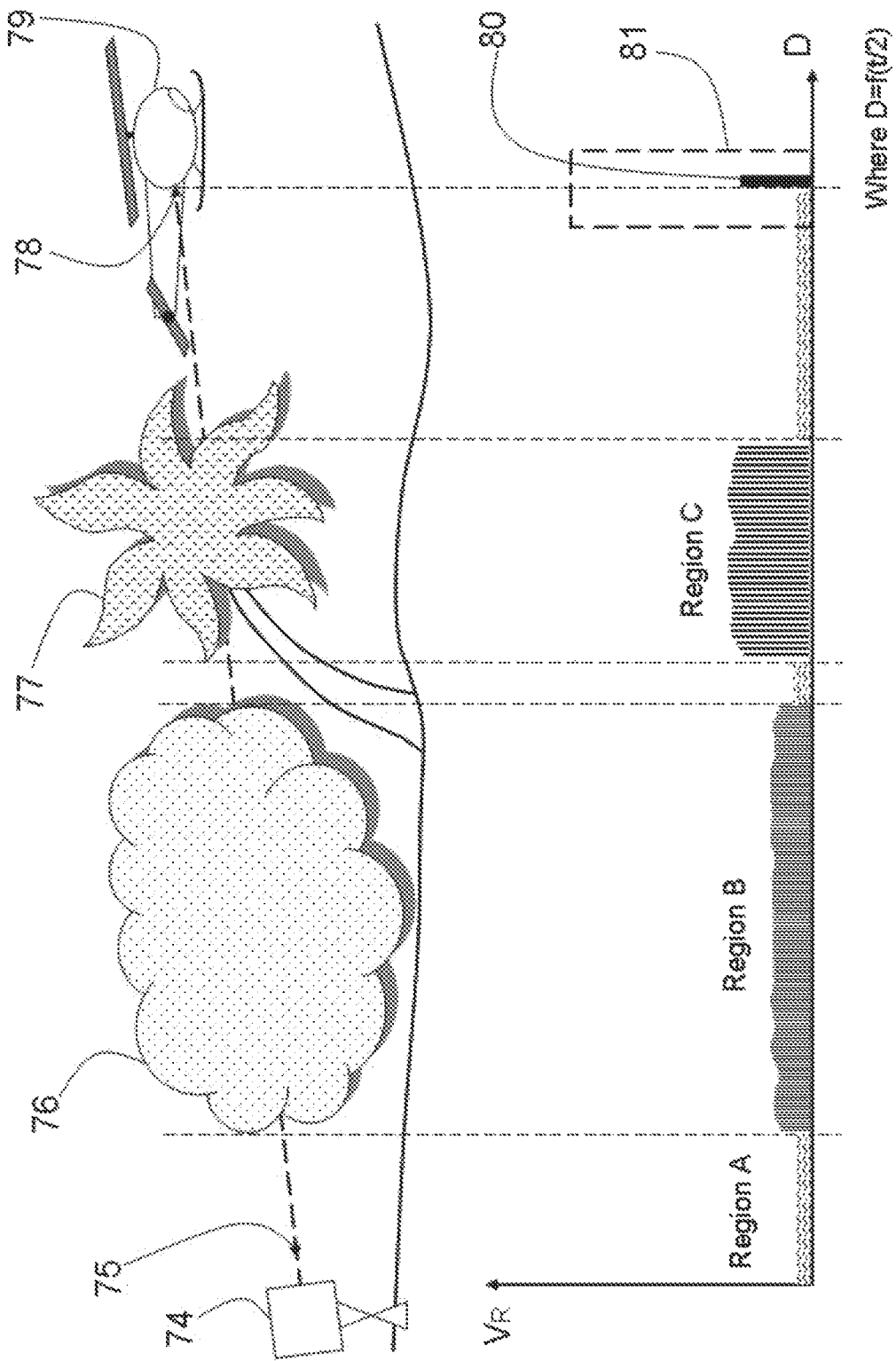
FIGURE 11. Partial Response/Diffuse Reflector

LADAR SENSOR FOR LANDING, DOCKING AND APPROACH

This application is a continuation of prior application Ser. No. 14/619,405, filed Feb. 11, 2015, which is a continuation of application Ser. No. 13/447,717, filed Apr. 16, 2012, which claims the benefit of U.S. Provisional application Ser. No. 61/475,955, filed Apr. 15, 2011, the disclosures of which are incorporated herein by reference.

FIELD OF THE INVENTION

The present invention relates to the field of remote sensing of objects and the application of lasers to the problems of 3-D imaging, remote object detection and definition, terrain mapping, bathometry, vehicle guidance, and collision/hazard avoidance.

BACKGROUND OF THE INVENTION

Many laser radar systems have been built which rely on the transmission of a high energy illuminating pulse. Most often these systems rely on solid state lasers operating in the near infrared with a lasing media of Neodymium-YAG or Erbium doped glass. Many of these systems utilize multiple pulses over a period of time to detect remote objects and improve range accuracy. These systems are often based on a single detector optical receiver. To develop a complete picture of a scene, the laser and optical receiver must be scanned over the field of view, resulting in a shifting positional relationship between objects in motion within the scene. Flash ladar systems overcome this performance shortcoming by detecting the range to all objects in the scene simultaneously upon the event of the flash of the illuminating laser pulse.

U.S. Pat. No. 3,230,527 awarded to Wehde, Wiesloch, et. al. describes an automatic landing system for a VTOL aircraft which relies on a microwave system to establish the distance to the ground station. However, this system is really a half duplex communication system or transponder, rather than a true radar altimeter, as it relies on an intelligent response from a microwave beacon at the ground station. U.S. Pat. No. 4,866,450 awarded to Chisholm describes an instrument landing system for an aircraft which also relies on a microwave transponder to establish the distance to the ground station with the improvement of a GPS based time synchronization. U.S. Pat. No. 5,593,114 awarded to Ruhl describes an automatic landing system for an aircraft which relies on a millimeter wave forward looking radar set or alternatively, a passive forward looking infrared (FLIR) imaging sensor to establish the distance and identify features on the runway. U.S. Pat. No. 5,334,848 awarded to Grimm describes an automatic docking system for a spacecraft which relies on a dual optical camera system and dichroic optical reflectors installed on the docking station.

SUMMARY OF THE INVENTION

The present invention comprises a flash ladar sensor with a number of innovations that produce an optimal performance in controlled approach, docking and landing applications. Additionally, the flash ladar sensor of the instant invention makes use of range gating techniques to penetrate through optical clutter such as aerosol clouds, blowing leaves, or sparse foliage. Range gating further enables underwater docking and bathometry. The result of these improvements is an improved range accuracy and better image quality of the flash ladar sensor for approach, landing, and docking in terrestrial, ocean surface, underwater and space environments.

The present invention is particularly relevant to the performance of both automatic and pilot-assisted landing, approach, and docking systems. Many attempts have been made to solve the problem of how to create the true 3-D imaging capability which would simultaneously enable all of the identified applications. The instant invention makes use of a number of new and innovative discoveries and combinations of previously known technologies to realize the present embodiments which enable the LADAR sensor to be particularly useful in landing, approach, and docking systems. The ability to operate the flash LADAR sensor in the cited applications is provided by practicing the invention as described herein. This invention relies on the performance of a multiple pixel, laser radar for capturing three-dimensional images of objects or scenes within the field of view with a single laser pulse, with high spatial and range resolution.

It is an object of this invention to provide an improved LADAR sensor with specific adaptations for use in landing, approach, and docking systems which overcomes the undesirable effects of high reflectance near field objects, airborne particulates, foliage, and other visual clutter. The improved LADAR sensor will have enhanced range accuracy and will enable better control of both automated and pilot-assisted landing, approach, and docking systems.

BRIEF DESCRIPTION OF THE DRAWINGS

FIG. 1 is a system block diagram of the flash ladar sensor.

FIG. 2 is a diagram of a simple profile of the automatic gain control voltage produced by a detector bias control circuit.

FIG. 3 is a diagram of an enhanced profile of the automatic gain control voltage produced by a detector bias control circuit.

FIG. 4 is a schematic diagram of a first circuit implementation of the enhanced profile of the automatic gain control voltage shown in FIG. 3.

FIG. 5 is a schematic diagram of a second circuit implementation of the enhanced profile of the automatic gain control voltage shown in FIG. 3.

FIG. 6 is an illustration of a typical docking maneuver between a first approaching spacecraft/underwater-craft and a docking port of a second host spacecraft/underwater-craft.

FIG. 7 is a diagram showing another important docking scenario of an airplane with probe approaching an aerial tanker with drogue during an in-flight refueling sequence;

FIG. 8 is a diagram showing an application where a ladar sensor and designating laser are carried on a first aircraft and are used to precisely and accurately designate a preferred landing site for a second aircraft.

FIG. 9 is a diagram of a gimbal mounted ladar and laser designator of a type which might be mounted in a pod on the underside of a first aircraft as depicted in FIG. 8.

FIG. 10 is a diagram of a helicopter landing in partially obscured conditions caused by rotor downwash, high surface winds, fog, smoke or a dusty landing zone FIG. 11 is a diagram showing the relationship between two types of diffuse reflectors and one abrupt reflector and the detected and amplified signals returned from the scene in the field of view of a ladar sensor, and a range gating technique which facilitates object recognition by eliminating signals associated with clutter in the scene in the field of view of the ladar sensor.

DETAILED DESCRIPTION OF EMBODIMENTS OF THE INVENTION

An embodiment of the present invention, the LADAR sensor for landing and approach is depicted in block diagram form in FIG. 1. The system is designed to produce a series of 3-dimensional images using pulsed laser light, a pixelated imaging optical receiver responsive to light reflected from the scene in the field of view, and timing circuits associated with each pixel of the imaging optical receiver. The LADAR sensor for landing and approach is capable of producing range and intensity data for any object or scene within its field of view from a single pulse of pulsed laser transmitter 2, in conjunction with system controller 1, transmit optics 3, receiver optics 5, detector array 6, readout integrated circuit 4, camera electronics and image processor 9, image analysis and bias vector control processor 8, and detector bias control circuit 7. The abbreviated description "ladar sensor", may be used as a shorthand reference to the "ladar sensor for landing and approach" of the instant invention, and the terms may be used interchangeably herein to refer to the elements of FIG. 1 collectively, and to their mutual operation.

Laser transmitter 2 in FIG. 1 produces a high power, short duration laser pulse, transmitting the light pulse through transmit optics 3, and illuminating the field of view of the receive optics 5. For maximum eye-safe power and enhanced propagation of the laser pulse, the wavelength of transmission is typically between 1.5 microns and 1.6 microns. For optimal penetration of water or other media the laser wavelength may be in the non-eye-safe visible range or non-eye-safe near IR range, typically 0.53 microns or 1.06 microns. The command to initiate the high power laser illuminating pulse is sent by the system controller 1 to the pulsed laser transmitter 2 via bidirectional electrical connections. System controller 1 also provides a global system clock, external communications, and acts to monitor and control a number of important variables, such as component and subsystem temperatures, and digital, analog, and high voltage supplies. Pulsed laser transmitter 2 also provides a much lower power optical sample of the output illuminating pulse as an Automatic Range Correction (ARC) signal to the detector array 6 via fiber optic connection. Transmit optics 3 diffuses the pulsed laser light output in a radiation pattern. The radiation pattern may be a uniform intensity over a solid angle matched to the viewing angle of the receive optics 5. Receive optics 5 collects light reflected from the objects and surfaces in the field of view of the receive optics 5 and directs the received light signal to fall on the detector array 6 positioned at the focal plane of the receive optics 5. Detector array 6 is a rectangular array of avalanche photodiodes in the preferred embodiment described herein. Each pixel in the array is connected to a unit cell of a readout integrated circuit 4 via a conductive indium pillar ("bump") establishing bidirectional electrical connections between detector array 6 and readout integrated circuit 4 in the preferred embodiment.

Readout integrated circuit 4 is comprised of a rectangular array of unit cells, each unit cell comprising a unit cell electrical circuit capable of amplifying, sampling, and detecting a low level current pulse produced by an avalanche photodiode of the detector array 6 in response to a light signal reflected from an object or light reflecting surface in the field of view of receive optics 5. Timing circuits within each unit cell of readout integrated circuit 4 are initiated by a global start pulse derived from the transmitted laser pulse, and are individually stopped when the unit cell detects the presence of a received light pulse in a normal mode, or by an externally imposed range gate signal in a second mode. Each unit cell of readout integrated circuit 4 is equipped with an analog sampling circuit and analog sample shift register which is clocked by the system clock, and which provides a time history of up to 40 or more analog samples of the output of the unit cell receiver circuit. The electrical outputs of the rectangular grid of unit cells of readout integrated circuit 4 and the associated timing circuit values are read out by on-chip row and column drivers controlled by camera electronics and image processor 9. When assembled in a 2 dimensional array, the digital output values of all of the unit cell electrical circuits of readout integrated circuit 4 are termed a "slice". Each slice is therefore a 2 dimensional array, with each element of the array a digital representation of an analog signal which is proportional to the intensity of light detected by the associated pixel of detector array 6 at a specific sample time. The slice is sampled at a rising edge of an on-chip clock oscillator resident on readout integrated circuit 4 which is initiated by a start pulse indicating the start of an outgoing laser light pulse from pulsed laser transmitter 2. In a preferred embodiment, the on-chip clock oscillator is phase locked to an external frequency stabilized reference oscillator. There are typically 20 slices in an image "frame", though the number of slices in an image frame may exceed 40 in some embodiments of readout integrated circuit 4. The number of slices in an image frame depends on the application and on the real estate available for the analog sample shift register within each unit cell electrical circuit of readout integrated circuit 4. The entire 3 dimensional image of a scene in the field of view of the ladar sensor is therefore a sequence of image frames, each image frame typically comprised of 20 slices. Typically, for a one-way range of 900 meters, or a two-way round trip of 1800 meters, a range window of 6 microseconds is necessary. At a system clock interval of 2.5 nanoseconds (400 MHz), 2400 slices would be produced for the full 3 dimensional image space to be characterized from a single pulse of pulsed laser transmitter 2. If the detector array 6 is a two dimensional array of 128×128 pixels, each with a 10 bit digital representation of both range and intensity associated with each pixel, it can be seen there could be a great deal of information to be recorded. In some cases, the ladar sensor might be operated in a such a mode where each image sequence of 2400 slices would be recorded. With the image sensor also having a typical 20 Hz pulse rate, this could create a very large data file very quickly. One of the goals of the present invention is to provide data reduction by means of circuits and data processors which allow for the rejection of large amounts of data which can be associated together and recognized as clutter in the path of the ladar sensor, while retaining key slice and image frame data associated with objects of interest, or targets, in the field of view of the ladar sensor.

Bidirectional electrical connections between camera electronics and image processor 9 and readout integrated circuit 4 carry row and column output selection commands to readout integrated circuit 4, and return electrical outputs from readout integrated circuit 4 individual unit cell electrical circuits when selected. Camera electronics and image processor 9 provides support circuitry in the form of analog to digital conversion for unit cell analog outputs of readout integrated circuit 4, multiple digital and analog power supplies required by readout integrated circuit 4, buffering of analog and digital signals, and a host of other support circuitry functions. The image processor resident on the camera electronics and image processor 9 circuit board may adjust the unit cell analog output values for dark current or DC offset, gain variations, amplitude dependent timing delay variations, and reference oscillator frequency drift. The functions of camera electronics and image processor 9 are similar to, and include many of the functions associated with the camera electronics section of the several flash ladar camera patents previously filed by the present inventors and cited and incorporated by reference herein. The image processor may include the algorithms necessary to produce a real time point cloud from the analog and digital unit cell signals for example.

Bidirectional bytewide communications between camera electronics and image processor 9 and image analysis and bias vector control processor 8 provide for transfer of image frames for image analysis, updates of calculated digital bias control values, calculation constants, and a number of other functions required to synchronize the operations of image analysis and bias vector control processor 8 with camera electronics and image processor 9. In a typical landing and approach scenario, reflected signals from the scene and objects in the field of view increase in amplitude as the vehicle with the ladar sensor mounted thereon approaches the landing or docking target. Because the ladar sensor requires a high level of amplification to be able to distinguish distant targets or dark objects, there is a high probability a number of pixels in the detector array 6 will begin to saturate as the vehicle approaches the landing or docking target. If pixels in the detector array 6 are saturated, their response time is compromised, and detected pulse widths may be stretched, contributing to range errors and loss of pixel-to-pixel relative intensity differentiation. In other words, as the number of pixels saturating increases, grey scale boundaries for objects in the field of view begin to disappear since all objects and reflecting surfaces begin to have the same (maximum) value of signal amplitude. Further, a number of secondary effects related to the integration of a large number of avalanche photodiodes on a single semiconductor substrate begin to emerge in a situation where a large number of the avalanche photodetectors in the array are overstimulated with light. A high net current through the substrate ground path raises ground potential on the detector array 6, reducing dynamic range for pixels adjacent to overstimulated regions of the detector array 6, a form of self-interference, or crosstalk. From this list of negative effects, a strong case can be made for preempting the onset of saturation in the detector array 6 caused by landing and approach scenarios.

Image analysis algorithms resident on image analysis and bias vector control processor 8 search image frames output from the camera electronics and image processor 9 for signs of saturation and create an automatic gain control profile calculated to provide an optimized image both for distant targets and nearby objects which otherwise could overwhelm and blind the ladar sensor at close ranges. The image analysis is conducted on whole image frames, partial image frames in an area of particular concern, such as a surrounding field of data proximal to an object identified by an object search and recognition algorithm, or by using a sequence of frames, each image frame having a time stamp associated with time of flight data. In this manner, an adjustment may be made to a control variable of the detector array 6 or readout integrated circuit 4 which compensates for the effects of non-uniform reflectivity of objects in the scene in the field of view of receive optics 5, or which compensate for weaker signal returns due to the relative distance of objects from the focal plane of the ladar sensor. A number of control variables are available to create an adaptive system control through the various and several variable voltages available as controls to the image analysis and bias vector control processor 8. The detector bias voltage ($V_{DET}$) is one such global control variable which may be adjusted by an output of image analysis and bias vector control processor 8 on a frame-to-frame basis, or dynamically within the time of flight of a transmitted and reflected laser pulse. Based on an assumed maximum range of 1 kilometer, this time of flight could be as great as 6.7 microseconds in free space, owing to the two-way nature of the transmit and return path. Depending on the power available from the pulsed laser transmitter 2, the angular field of view of the transmit optics 3 and receive optics 5, known reflectivity characteristics of objects to be found in the field of view of receive optics 5, and other system parameters, this maximum time of flight may be adjusted up or down depending on the application. A reduction in detector voltage $V_{DET}$ lowers the optoelectronic conversion gain of all of the avalanche photodiodes comprising the pixels of detector array 6, positioned at the focal plane of receive optics 5.

Image analysis and bias vector control processor 8 also has an output control connected as a global control parameter which affects the front end amplifier gain ($V_{FDBK}$) on the unit cell electrical circuits resident on readout integrated circuit 4. The effect of changing the $V_{FDBK}$ parameter is similar to the effect of changing the detector voltage $V_{DET}$, in as much as it is capable of reducing or increasing signal amplitude. Each pixel of detector array 6 is connected to a unit cell electrical circuit of readout integrated circuit 4. The first stage of each unit cell electrical circuit is a transimpedance amplifier with an electronic gain which is inversely proportional to the control voltage $V_{FDBK}$. The inverse relationship between $V_{FDBK}$ and the gain of the readout integrated circuit 4 unit cell electrical circuits is taken into account by the image analysis and bias vector control processor 8 when computing updated values of $V_{FDBK}$. The $V_{FDBK}$ control voltage is computed by the image analysis bias vector control processor 8 and forwarded to the camera electronics and image processor 9 for D/A conversion and distribution as an analog value to each and every unit cell of the readout integrated circuit 4. A global low pass filter control parameter $V_{FT1}$ is also controlled by image analysis and bias vector control processor 8 which may be used to enhance signal-to-noise ratio (SNR), and thereby reduce range errors and image intensity noise. The $V_{FT1}$ control variable is directly proportional to the amount of filtering, i.e., a higher value of $V_{FT1}$ results in a lower corner frequency of all the lowpass filters associated with each unit cell electrical circuit of readout integrated circuit 4. Further, a variable and global control voltage $V_{CLAMP}$ is used by image analysis and bias vector control processor 8 to set a pulse detection threshold voltage in each unit cell of readout integrated circuit 4.

The adaptive control system for the ladar system described above relies on multi-variable computations embodied in image analysis and bias control vector processor 8. These computations are made using a high speed logic and arithmetic processor. The implementation in the preferred embodiment is a state machine using common logic elements and flip-flops resident on a Xilinx Virtex IV field programmable gate array. An advanced implementation is embodied in a Power PC microprocessor core available on the same Virtex IV FPGA from Xilinx, the program loaded on power-up from non-volatile memory. The image analysis and bias control vector processor 8 outputs updated digital values of detector bias ($V_{DET}$), front end gain ($V_{FDBK}$), low pass filter corner ($V_{FT1}$), and pulse detection threshold voltage ($V_{CLAMP}$). These four values make up the bias control vector, which is the instrument of the adaptive system control function. Once the updated digital values are ready, they are passed to camera electronics and image processor 9 and converted to analog values by digital-to-analog converters for distribution to the readout integrated circuit 4. The exception to this rule is the detector bias voltage ($V_{DET}$), which is passed to detector bias and control circuit 7 directly from image analysis and bias control vector processor 8.

Automatic gain control may be effected by modification of the readout integrated circuit 4 and/or the detector array 6 bias as described above as well as separately or in combination with pulse to pulse modification of the pulse energy from the pulsed laser transmitter 2 and/or pulse to pulse modification of the aperture of the transmit optics 3. Electronic biasing modifications are typically easier to implement.

Detector bias control circuit 7 has several important functions. The first role of detector bias control circuit 7 is to act as a control interface from the low level digital logic levels (<5VDC) of image analysis and bias control vector processor 8 to the high voltage avalanche photodiode detector bias ($V_{DET}$) which may be as great as 60VDC. A second function of detector bias control circuit 7 is to provide digital to analog conversion of signals transmitted to detector bias control circuit 7 from image analysis and bias control vector processor 8. A third role of bias control circuit 7 in an enhanced embodiment, is to shape the detector bias profile as a function of time, and to supply this voltage to detector array 6. Detector bias control circuit 7 also provides monitoring of the detector bias voltage actually supplied to the detector array 6 and converts the monitored analog levels to digital values and returns these digital values to image analysis and bias control vector processor 8.

The image analysis and bias control vector processor 8 also plays and important role in approach, docking and landing situations by analyzing the 3D orientation of the vehicle and landing or docking site in real time and identifying hazards. This analysis may result in commands to autonomous system control systems or the transfer of data to the vehicle systems responsible for navigation, guidance and control (NG&C) or pilot displays. Communication between the image analysis and bias control vector processor Band the vehicle NG&C may be bidirectional.

FIG. 2 is an example of a very basic bias profile supplied to detector array 6 by detector bias control circuit 7. The bias voltage $V_F$ is calculated from test data associated with the particular detector array. A maximum value ($V_{MAX}$), and a minimum value ($V_{MIN}$) are known, as well as a number of data points on the curve of the relationship between detector bias versus optoelectronic gain. The $V_{MAX}$ value is a voltage above which there is a likelihood of permanent damage to the detector array. The $V_{MIN}$ value is a value below which the performance of the detector array is outside of acceptable norms. Based on the image analysis on past image frames and the known performance curves of the detector array 6, the value of $V_F$ is calculated and supplied in digital form as the value for the analog $V_{DET}$ parameter to be applied by the detector bias control circuit 7. In the simple bias profile of FIG. 2, the detector bias control circuit responds at time $T_{ON}$ to a control input from the image analysis and bias vector control processor 8 which will turn on the detector bias control circuit 7. A risetime 11, of $T_R$ nanoseconds, is a characteristic of the fast reacting circuit which drives the supply voltage to detector array 6, which finally arrives at the programmed value $V_F$ at the final time $T_F$. The voltage $V_F$ is applied during the time of flight period 12 between $T_F$ and $T_{OFF}$. At time $T_{OFF}$, which is at the end of the time of flight period 12, the bias to detector array 6 ($V_{DET}$) is switched off by a control input from image analysis and bias control vector processor 8, and the detector bias voltage parameter $V_{DET}$ returns to zero during a falltime 13 of $T_{Fall}$ nanoseconds.

With the bias profile of FIG. 2, changes may only be made to the final voltage $V_F$ during the period between pulses, typically on the order of 30 milliseconds. Therefore, using the simple bias profile of FIG. 2, automatic gain control may be effected on a pulse-to-pulse basis using the image frame or frames immediately preceding the current image sequence to calculate a new value for $V_F$ which will be appropriate to the current image sequence. Because the value $V_F$ is supplied to detector array 6 as the detector bias parameter $V_{DET}$, and since the detector array 6 gain varies directly with $V_{DET}$, automatic gain control is provided for by the detector bias control circuit 7 operating in conjunction with image analysis and bias control vector processor 8.

FIG. 3 illustrates an enhanced detector bias profile with the aim of providing automatic gain control on a single pulse during time of flight. An initial voltage $V_I$ and a final voltage $V_F$ may be determined purely from detector array 6 performance data, or adjusted based on previous image sequences by the image analysis and bias control vector processor 8. In either case, if the values for $V_I$ and $V_F$ are to be determined purely from detector array 6 performance data, or adjusted based on previous image frames, the relations $V_F<V_{MAX}$ and $V_I>V_{MIN}$ should be observed. The time axis in FIG. 3 represents the time of flight of a transmitted laser pulse to a distant reflector and the return path, so the time axis is proportional to twice the distance to the reflecting surface. If an object is very close to the ladar sensor, it will be necessary to operate the detector at a minimum gain to avoid saturation of the detector pixels which receive the light reflected from the nearby object. This condition is met by choosing $V_I$ to be very close to, or the same as, $V_{MIN}$. The detector bias voltage $V_{DET}$ is initiated at time $T_{ON}$ by a command from the image analysis and bias control vector processor 8 sent to the detector bias control circuit 7. After a risetime 15 of $T_{ON}$ nanoseconds, the detector array 6 is operational and ready to receive incoming reflected laser light pulses. Therefore, the command to turn on the detector bias voltage $V_{DET}$ must be issued slightly before the transmitted laser light can travel twice the distance corresponding to the specified minimum range of the ladar sensor. In a typical case, the minimum range of the ladar sensor is just the focal length of the receive optics 5, since it would not be very useful to try to determine range to objects in the field of view very near to the ladar sensor which cannot be brought into focus. Region 1 in the diagram is the short time span representing a short range region in close proximity to the ladar sensor, but typically beyond the focal length of the receive optics 5. In this region 1, the detector array 6 bias voltage is held constant at the initial voltage $V_I$ represented in the diagram by a straight level line 16 for a time period of $T_{TR}-(T_{ON}+t_R)$ nanoseconds. At the end of the time period of region 1, at time $T_{TR}$ which typically corresponds to a distance of 10-100 focal lengths, the detector bias control circuit 7 will begin adjusting the $V_{DET}$ parameter upward to increase the gain of the detector array 6 in order to detect objects in the mid range region 2 which are distant enough to require additional gain from the detector array 6.

The manner of upward adjustment in region 2 may be a simple linear ramp 18, or a square law or exponential curve represented by the dashed line 17. Depending on the size and shape of objects, and their distance from the ladar sensor, the reflected power received by receive optics 5 may vary inversely with the distance squared, cubed, or raised to the fourth power. For large surfaces in the near field, the reflected power received by the ladar sensor reduces proportional to the square of the distance, D. For linear targets in the near field, such as a wire, pole, or thin beam, the reflected power received by the ladar sensor reduces proportional to the cube of the distance, D. For surfaces in the far field, the reflected power received by the ladar sensor reduces proportional to the distance, D raised to the fourth power.

The near field approximation assumes the transmit optics 3 has a field of illumination exactly overlapping the field of view of receive optics 5. The detector array 6 has pixels comprised of avalanche photodiodes with a diameter of 70 microns. Therefore, at a distance of 1000 focal lengths from the transmit optics 3 focal plane, targets with dimensions of 70 millimeters will be illuminated with the same amount of power as a 7 millimeter target at 100 focal lengths from the transmit optics 3 focal plane. This means for a planar target surface of minimum dimensions of 70 mm in both horizontal and vertical planes, which is aligned with the optical viewing axis and positioned perpendicular to the optical viewing axis of a single pixel of detector array 6, the illuminating power intercepted does not change at any distance less than 1000 focal lengths from the receive optics 5. The reflected power from any and all targets in the field of view reduces proportional to the square of the distance on the return path to the receive optics 5, which are co-located and boresighted with transmit optics 3. Therefore, the near field approximation of $1/D^2$ holds only for the conditions outlined above.

For targets which have only one dimension meeting the above near field criteria, such as a wire, the intercepted illuminating power will reduce linearly with the distance from the transmit optics 3. For the case of a substantially linear target such as a wire, the intercepted illuminating power reduces as $1/D$ and the geometric losses on the return path always vary as $1/D^2$. The compounded result for a substantially linear target is thusly a reflected power at the receive optics 5 focal plane proportional to $1/D^3$, where D is the distance to the target. For surfaces beyond the near field limits, the received power at the focal plane of receive optics 5 reduces proportionally to the fourth power of distance ($1/D^4$), as in the familiar radar range equation.

The shape of the curved dashed line segment 17 in FIG. 3 is chosen to produce a constant output signal from an avalanche photodiode pixel of detector array 6 for a given target of large dimensions meeting the near field conditions as it is moved radially through the distances of region 2 along the optical axis of transmit optics 3 and receive optics 5 of the ladar sensor. The detector bias curve segment 17 is calculated using the known ladar sensor system parameters and experimentally verified by making range measurements and adjusted as required. To properly compensate for the square law decay of received power at receive optics 5 in region 2 so a constant output is maintained for a given reflectance target of dimensions meeting the near field criteria outlined above, the system gain should nominally be increased with the square of the distance across region 2. If the only variable to be controlled is the detector bias $V_{DET}$, it would be desirable to increase $V_{DET}$ proportional to the square of the distance in region 2. In region 3 where distance is the greatest, the challenge is to detect objects at distances which require maximum amplification, so the $V_{DET}$ voltage 19 supplied to detector array 6 is held at a constant level $V_F$, typically at or near the maximum allowable level $V_{MAX}$. Once the maximum time of flight has been reached, proportional to twice the maximum distance, the $V_{DET}$ voltage is switched off and allowed to fall 20 over a falltime of $T_F$ nanoseconds. A similar (though inverted) bias profile may be applied to the global parameter $V_{FDBK}$, which controls the transimpedance gain of all the unit cell amplifiers resident on readout integrated circuit 4, which are connected to the thousands of avalanche photodetector elements of detector array 6. $V_{FDBK}$ is a control voltage which runs between 1.4VDC and 1.8VDC, and which is inversely proportional to the effect; i.e., increasing $V_{FDBK}$ decreases the gain globally on the unit cells of readout integrated circuit 4. In the instance of a typical control profile for $V_{FDBK}$, the image analysis and bias control vector processor 8 would start the $V_{FDBK}$ parameter at or near its highest level, 1.8VDC, to provide for a lower gain in region 1, then reduce $V_{FDBK}$ exponentially or linearly in region 2 to raise the gain, and then hold $V_{FDBK}$ constant at the minimum level of 1.4VDC in region 3 to provide maximum gain for distant objects. The pulse trigger reference threshold voltage $V_{CLAMP}$ may also be used to globally desensitize all of the unit cells of readout integrated circuit 4 in the near field of region 1. $V_{CLAMP}$ runs between limits of 1.0VDC to 1.35VDC. Higher values of $V_{CLAMP}$ will globally reduce the sensitivity of the pulse recognition circuits of each unit cell of readout integrated circuit 4, so a typical bias profile for $V_{CLAMP}$ would involve image analysis and bias control processor 8 starting $V_{CLAMP}$ at or near the maximum level of 1.35VDC in region 1 to reduce sensitivity to nearby reflecting objects, reducing $V_{CLAMP}$ exponentially or linearly in region 2 to increase the sensitivity to objects in the mid range, and then holding $V_{CLAMP}$ at or near the minimum level of 1.0VDC in region 3 to provide maximum sensitivity to reflections from distant objects.

FIG. 4 is a circuit diagram for a detector bias control circuit 7 capable of supplying detector array 6 with either the simple bias profile of FIG. 2, or the enhanced bias profile of FIG. 3. If the simple bias profile of FIG. 2 is desired, control voltage source V1 is set to zero by input from image analysis and bias control vector processor 8, and high voltage supply V2 is set to any desired value of $V_F$ up to and including $V_{MAX}$. Voltage source V1 is typically a digital-to-analog converter in a preferred embodiment, but may be a single bit D/A converter, often just a digital logic gate with open collector output pulled up to an analog voltage supply through a resistor (not shown). In either case, an analog voltage supply of +5VDC is assumed. With V1 held at zero, the transistor Q2 will be off, and the voltage at the collector of Q2 will be very close to the supply voltage V2, since the multiplying effect of the darlington pair Q1 and Q5 means very little base current will flow into the base of Q1. In this condition, $V_{OUT}$ will rise to a level approximately two diode voltage drops (1.4VDC) below the voltage at the base of Q1 (VB1), which results in an output voltage VOUT very close to V2−1.4VDC=$V_F$. In the schematic diagram of FIG. 4, the dotted line box around L1, C2, and R6 represents the equivalent circuit of detector array 6 for the purposes of analysis. C5 is a supply voltage decoupling capacitor which also contributes to the stability of Darlington pair Q1, Q5. In the simple bias profile of FIG. 2, resistor R2 and capacitors C3 and C4 are optional and their values may be set to zero, since they serve to shape the rise and fall times of the output voltage waveform, VOUT. The inductor L5 is included as a parasitic element in the circuit to account for bondwire inductances in the $V_{DET}$ power and ground connections to detector array 6 bias voltage inputs. With the control voltage source V1 set to zero by command from image analysis and bias control vector processor 8, then the output voltage VOUT will be solely a function of V2. V2 is a variable high voltage source which may then be brought up from zero by a command from image analysis and bias control vector processor 8 to $V_F$+1.4VDC with a risetime 11 of $t_R$ nanoseconds. The output voltage VOUT is then held at $V_F$ for a time period 12 equal to $T_{OFF}$-$T_F$ microseconds. Once the time $T_{OFF}$ is reached, the range window of the ladar sensor is closed by dropping the variable voltage source V2 to zero with a falltime 13 of $t_F$ nanoseconds upon command from image analysis and bias control vector processor 8. The output voltage waveform VOUT is therefore applied to the detector array 6 as the $V_{DET}$ control parameter associated with the discussion of FIG. 1 above and in the shape of the bias profile shown in FIG. 2.

To realize the enhanced bias profile of FIG. 3, the circuit of FIG. 4 is utilized in a different manner. Prior to transmission of a laser light pulse from pulsed laser transmitter 2, variable high voltage source V2 is switched on concurrently with control voltage source V1 upon command from image analysis and bias control vector processor 8. Specifically, V2 is set to $V_F$+1.4VDC to overcome the two base-emitter voltages of Q1 and Q5. V1 is set to a high condition in the form of a logic output from image analysis and bias vector control processor 8, pulled up to the +5VDC analog voltage supply through a resistor (not shown). These actions cause the output voltage VOUT to rise up to the initial voltage $V_I$ with a risetime 15 of $t_R$ nanoseconds. In the preferred embodiment of FIG. 4 where R15=4.7KΩ, and R2=36KΩ, the +5VDC input V1, less the 0.7VDC base to emitter voltage of Q2 produces 4.3VDC across R15, which will cause approximately 0.915 mA of current to flow through R15. A majority of this current flows through R3, producing a voltage drop of 32.94VDC, resulting in a voltage of 27.06 at the collector of Q2. VOUT will then be two base emitter voltages below the collector of Q2, at 25.66VDC. This is the desired value of $V_I$ (segment 16 in FIG. 3) in the case of the conditions for a particular detector array 6, though many detector arrays 6 will have a lower desired initial voltage $V_I$. These lower values of $V_I$ may be provided for by reducing the value of R15 proportionally, and in an alternative embodiment, R15 is a manually adjustable resistor, and in a further embodiment R15 is an electrically adjustable resistor, responsive to a digital input from image analysis and bias control vector processor 8. The output voltage VOUT is held at $V_I$ for targets at distances from the ladar sensor indicated in FIG. 3 by Region 1, for a time period 16 equal to $T_{TR}$-($T_{ON}$+$t_R$) microseconds. At time $T_{TR}$, a command from image analysis and bias control vector processor 8 changes control voltage source V1 from +5VDC to near 0VDC, turning Q2 off, and causing the voltage at the collector of Q2 to rise towards V2, which has been set at $V_F$+1.4VDC to compensate for the forward base-emitter voltages of Q1 and Q5. The overall time period and shape of the risetime 17 in Region 2 may be generated by a single time constant exponential with R3 and C3, or by a staggered exponential with R2 and C4 set to non-zero values as shown. The minimum configuration with R3=36KΩ, R2=0Ω, and C3=C4=0 pF would produce a rapid risetime 17, relying only on the parasitic capacitance at the collector of Q2 and the pullup resistor R3 for a time constant, reducing the region 2 time period to somewhere around 200-300 nanoseconds. As longer risetimes 17 become necessary, the value of C3 can be increased up to several tens of picofarads to produce risetimes 17 on the order of 10-20 microseconds if desired. If a closer fit to a square law behavior is desired, staggered time constants may be superimposed to closely track a square law behavior by setting R2 and C4 to appropriate values to give a time constant close to the time constant formed by the R3, C3 pair. Use of staggered time constants can be expanded beyond two, to any number of superimposed exponentials, to approximate other time vs. voltage behaviors as required. Depending on the application and the target environment the ladar sensor is operating within, many different bias curve segments 17 may be realized with this circuit topology, and both C3 and C4 may be adjustable capacitors in an alternative embodiment. R2 and R3 may also be adjustable, though any adjustment of R3 may require compensating adjustment of R15 to properly set $V_I$. (The generation of linearly ramped risetime 18 will be discussed in association with the discussion of the circuit configuration of FIG. 5 which follows). Once the output voltage VOUT reaches $V_F$ at time $T_F$, VOUT is held constant 19 for targets within the range window of Region 3 for a time period of $T_{OFF}$-$T_F$ microseconds. The range window closes upon command from image analysis and bias vector control processor 8, in the form of a command to drop variable voltage source V2 to zero volts which causes VOUT to return to zero during a falltime 20 of $t_F$ nanoseconds.

FIG. 5 shows a circuit topology also capable of producing the basic bias profile of FIG. 2 or the enhanced detector bias of FIG. 3. In this case, the control voltage source V1 is produced by a digital-to-analog converter U1 enabled by digital output commands from image analysis and bias vector control processor 8. In the case of FIG. 5, the digital-to-analog converter of the preferred embodiment is a 10 bit parallel input, 140 MHz, voltage output, video DAC. The full scale voltage output of the DAC U1 is +5VDC. Other D/A types may be used in alternative embodiments, such as current output DACs, or D/A converters with serial inputs. The remainder of FIG. 5 is familiar; the only other change is the elimination of capacitors C3 and C4 and resistor R2 of the FIG. 4 circuit. The use of a DAC to generate control voltage source V1 allows for an infinite variety of detector bias profiles to be realized without the need for timing capacitors and resistors. The enhanced detector bias profile of FIG. 3 can be easily met by a command sequence from image analysis and bias vector control processor 8. First, a command is sent with a 10 bit parallel digital word at time $T_{ON}$ to set V1 at a level which produces the desired initial voltage 16 at $V_I$ volts. Second, curved segment 17 may be generated by a lookup table or mathematical algorithm running on the digital image analysis and bias control vector processor 8 and the values sent to the digital input of DAC U1. Linear ramp segment 18 may be generated by simply incrementing the digital value originally used to set $V_I$. The regular increment may be at the full system clock rate or at any integer fraction of the system clock rate to effect the slope of linear segment 18. Third, once the digital output to DAC U1 reaches the value associated with the final voltage $V_F$ at time $T_F$, this digital value is latched and held to produce level segment 19 for all of Region 3. Fourth, the image analysis and bias control vector processor 8 sends a command to drop variable voltage source V2 to zero volts which causes VOUT to return to zero during a falltime 20 of $t_F$ nanoseconds.

FIG. 6 shows a typical landing and approach scenario for the improved ladar sensor of the instant invention. A docking vehicle, in this instance spacecraft 21, approaches docking port 27 along the axis AA of docking port 27. Docking port 27 may be part of an orbiting space station, laboratory, or unmanned satellite. Spacecraft 21 has a nosecone 22 with ladar sensor 23 mounted at the forward tip. The ladar sensor has an angular field of view 24, generally symmetric with its rotational axis (in this case coincident with AA). Docking port 27 has a front face 25 with reflective targets 26 mounted thereon, and an interior 28 which will receive spacecraft 21. Reflective targets 26 may be metallic, or may be painted onto the front surface 25 of docking port 27 with a reflective paint. The highly reflective targets 26 and the lack of any absorbing atmosphere or particulate aerosols, create conditions where the spacecraft 21 is able to detect the docking port 27 at great distances. Because the approach before docking is deliberately slow, the operations of image analysis and bias control vector processor 8 of the ladar sensor are of particular interest. Because image analysis and bias vector control processor 8 decides whether to use simple bias profile (FIG. 2) or enhanced bias profile (FIG. 3) and calculates the bias parameters $V_I$, $T_{TR}$, $V_F$, $T_F$, $T_{OFF}$ and the shape of curve 17 or 18, the slow approach of of spacecraft 21 means these bias parameters will change slowly (i.e., with a long time constant). The spacecraft docking scenario, therefore requires the maximum differential between the setpoint of maximum voltage for $V_F$ required to produce maximum optical gain from detector array 6 while the spacecraft 21 is at maximum range, and the minimum level for the $V_F$ setpoint required to prevent saturation of detector array 6 at distances of less than one meter. The automatic gain control effected by the slow adjustment of $V_F$ from absolute maximum to absolute minimum in the spacecraft docking scenario illustrates the utility of image analysis and bias control vector processor 8 when coupled with detector bias control circuit 7 to produce bias levels for detector array 6 optimally and adaptively. In an alternative embodiment, the docking scenario illustrated in FIG. 6 may be conducted underwater, with spacecraft 21 replaced with an underwater remotely piloted vehicle such as a mini-sub docking with a larger ocean-going submarine with a docking port 27. The docking scenario of FIG. 6 also plays out in the docking of a surface ship at a pier or mooring, or with an amphibious vehicle such as a landing craft, amphibious tank, or hovercraft approaching a large ocean-going vessel such as an LST (Landing Ship, Tank), amphibious transport dock, or LSD (Landing ship Dock). In both embodiments 3D time dependent data captured with the instant invention is processed in the camera electronica and image processor 9 into a data product such as a 3D point cloud and transferred to the image analysis and bias vector control processor 8 where its orientation and range with respect to the docking port is determined and commands or data may be generated to effect autonomous efficient docking. Alternatively real-time display data may be generated so a human can pilot the craft for efficient docking.

FIG. 7 illustrates a slightly different docking and approach scenario where the benefits of the instant invention are particularly valuable. Pictured in FIG. 7 is a jet aircraft 29 with a fuel transfer probe 32 extended to connect with a flying drogue 34 attached to the end of hose 35 trailing from a flying tanker (not shown). Radome 30 is mounted in a forward location on aircraft 29 and is made of a material transparent to infrared radiation at the wavelength of transmission of pulsed laser transmitter 2. The ladar sensor of the preferred embodiment described herein is mounted within radome 30 and oriented in a forward looking direction with a generally symmetric conical field of view delineated by dashed limit lines 31 and 36. Drogue 34 has a generally conic profile with an interior 37 and a front face 38. Probe 32 has a mating tip 33 which is typically reflective at the transmission wavelength of pulsed laser transmitter 2 and may be made of a reflective metallic material, or may have a reflective coating applied. The front face 38 of drogue 34 may also be made of a reflective material or have a reflective coating applied. In the aircraft refueling application of FIG. 7, the ladar sensor of the instant invention sees a major difference in the presence of a reference reflecting surface 33 attached to the probe of the approaching aircraft. This difference means a highly reflective surface will always be in the near field of the ladar sensor requiring a lower level of system gain, while a more distant target (the fuel tanker and trailing drogue) must still be imaged sufficiently, requiring greater system gain, to allow for the refueling aircraft to approach the drogue and tanker aircraft accurately and safely. This scenario plainly dictates the enhanced detector bias profile of FIG. 3 which allows for the reduced bias $V_I$ to be applied during the time associated with target ranges in region 1 associated with the fuel transfer probe distance, while maintaining the increased bias of $V_F$ for the drogue target in region 3 as the approach and fueling sequence begins. As the probe closes in on the drogue, the bias curve 17 or 18 of region 2 will apply, maintaining correct bias on detector array 6, keeping the detector pixels from saturating and the image of the drogue from blooming. In an alternative embodiment, the ladar sensor is installed in the flying boom of the fuel tanker, and is used by the boom operator to guide the boom into the fuel receptacle of the refueling aircraft. Due to aerodynamic forces, docking the probe to the drogue may require the image analysis and bias vector control processor 8 to predict the center of the drogue 34 in 3D space while it is time dependently distorting in shape and randomly oscillating in space; again real time commands or data may be transferred to the aircraft 29 effecting autonomous efficient docking. Alternatively real-time 3D display data may be generated so a pilot can rapidly dock the probe 32 to the drogue 34 center and refuel efficiently.

FIG. 8 illustrates a further development of the ladar sensor for landing and approach. In this diagram, designator platform 39 orbits the landing zone 45 and the landing target 46, and illuminates the landing target 46 with a designating laser beam 42. Designating laser beam 42 emanates from tracking illuminator 41, and may be an independent illuminating laser, or may be the beam from pulsed laser transmitter 2. (In an alternate embodiment the designator platform 39 may be the landing vehicle 39 and the tracking illuminator 41 may be a landing system 41.) Tracking illuminator 41 is mounted on a lower surface of designator platform 39 within radome 40. Radome 40 is transparent to light at the wavelength of transmission of the illuminating laser within tracking illuminator 41. Tracking illuminator 41 is made up of a ladar sensor according to the diagram of FIG. 1, and may include a motorized gimbal mount, inertial reference or GPS positioning reference, and a tracking and pointing processor. Antenna 51 is mounted on designator platform 39 which allows designator platform 39 to receive GPS signals, relay telemetry signals to a controlling ground station or satellite, and provide for updates to its database and firmware via radio communications link. Designator platform 39 may also be a portable man-pack which may be used by an individual soldier in battlefield conditions. The tracking illuminator 41 has a generally symmetric and conical field of view bounded by limit lines 43 and 44. A reflected portion 47 of designating laser beam 42 is received by tracking optical receiver 48 mounted on guided vehicle 49. Guided vehicle 49 carries a payload 50 for delivery to landing target 46. The tracking optical receiver 48 in guided vehicle 49 may be as simple as a four quadrant photodiode cell, with receiver electronics capable of determining the direction of arrival of reflected portion 47 of designating laser beam 42 based on amplitude balance or phase discrimination between the opposing detectors in the quadrant. In a preferred embodiment, guided vehicle 49 may have a 32×32 ladar sensor according to the configuration of FIG. 1, minus the pulsed laser transmitter 2 and transmit optics 3 serving as a tracking optical receiver 48. With a 32×32 receive-only ladar sensor, the guided vehicle is typically incapable of making absolute distance measurements, yet able to construct relative distance image frames based on reflected portion 47 of designating laser beam 42, which allow it to properly choose its own point of contact with landing target 46. In the case of a receive-only ladar sensor mounted on guided vehicle 49, the timing circuits in each unit cell are periodically restarted by a master initiation signal indicating the beginning of an observation period, or image frame. The advantage of having an imaging 3D ladar sensor within tracking illuminator 41 is the acquired ability to more accurately steer designating laser beam 42 onto the landing target 46 and more rapidly update the steering commands to the tracking motorized gimbal mount within tracking illuminator 41. More frequent steering command updates and more accurate positioning of designating laser beam 42 means lower likelihood of error in delivering payload 50 accurately onto landing target 46. The advantage of incorporating a 3D ladar sensor for landing and approach is of increased importance as the presence of obstacles such as boulder 52 or irregularities in the landing zone 45 surface or landing target 46 surface arises. The designating platform 39 has the option of moving the designating beam slightly forward (to the right in the diagram of FIG. 8) of the landing target in this illustration to place the center of payload 50 directly over the center of landing target 46 or to ensure the tail rotor of guided vehicle 49 clears boulder 52. This capability enabled by the presence of a ladar sensor on tracking illuminator 41 is of greater importance when guided vehicle 49 is guided by a very simple tracking optical receiver 48, without its own imaging and timing capability. Landing zone 45 may be the surface of an asteroid, planet, moon, satellite, or even a man-made vehicle and may be visibly marked or unmarked. Landing target 46 may be on a prepared helicopter pad, deck of a ship, runway, or a selected feature on a wheeled or tracked land vehicle. Landing target 46 may be visibly marked or unmarked.

In alternative embodiment the designator platform 39 in FIG. 8 is the landing vehicle 39 and the guided vehicle 49 is not present. Landing zone 45 may be the surface of an asteroid, planet, moon, satellite, or even a man-made vehicle and may be visibly marked or unmarked. Landing target 46 may be on a prepared helicopter pad, deck of a ship, runway, or a selected feature on a wheeled or tracked land vehicle. Landing target 46 may be visibly marked or unmarked and may be moving independently of landing vehicle 39—as the deck of an aircraft carrier in rough seas—or may be obscured by dust, smoke or clouds. The dust may be generated by the landing vehicle 39 and landing zone 45 itself as when a helicopter rotor blade wash creates "brown out" dust clouds during landing in fine sand or dirt. Landing vehicle 39 may be an interplanetary entry, descent and landing vehicle, a helicopter, an airplane or an unmanned air vehicle or system. Under these circumstances the tracking illuminator 41 may be the landing system 41, and may only include a ladar sensor 60, incorporating all the elements of FIG. 1, without a separate tracking laser or the tracking processor 61. In some circumstances the landing system 41 may not include the motorized gimbal for the GPS. In all embodiments 3D time dependent data captured with the ladar sensor 60 is processed in the camera electronics and image processor 9 into a data product such as a 3D point cloud and transferred to the image analysis and bias vector control processor 8 where the landing vehicle's 60 orientation and range with respect to the landing zone 45 and landing target 46 is determined and commands or data may be generated so control surfaces and engines of the landing vehicle 39 can effect autonomous, efficient landing and hazard avoidance. The rock 52 in FIG. 8 is an example of a hazard to be avoided. Alternatively real-time display data may be generated so a human can pilot the landing vehicle 39 for efficient landing.

FIG. 9 shows a more detailed view of tracking illuminator 41. Base 53 has flanges 54 with clearance holes (dashed lines) for mounting to mounting points on an airframe, ground vehicle, satellite, or structure. Rotation in the azimuthal plane ($\varphi$) about axis CC is provided for by rotor plate 56 riding on ball bearings 55. An electric motor is incorporated within the base of the rotational stage, and electrical connections provide actuation capability to designating platform 39. Together, these elements 53, 54, 55, 56, and the electric motor comprise a motorized rotational stage. Motorized rotational stages are well known in the art, and many superior designs are available which provide the capability described above. Formed integrally with rotor plate 56 is pedestal yoke 57 which supports rotational shaft 58 attached to rotor pedestal 59. Rotational shaft 58 rides on ball bearings kept in bearing races within pedestal yoke 57. An electric motor and electrical connections provide actuation capability to designating platform 39 and allow the rotor pedestal 59 to be rotated through 90° of elevation ($\Theta$). Together, these elements 57, 58, 59, and the electric motor comprise a motorized rotational stage, though of a different type than the one specified above for the azimuthal ($\varphi$) plane. As a unit, these two orthogonal motorized rotational stages comprise a motorized gimbal mount, capable of traversing in two orthogonal angular planes simultaneously upon command from a controlling electronic system. Mounted atop rotor pedestal 59 is a ladar sensor 60 according to the present specification with two modifications designed to enhance the performance of the designator platform 39 in the application shown in FIG. 8. Ladar sensor 60 incorporates all of the elements of FIG. 1, though these elements 1-9 are not shown for the sake of clarity in FIG. 9. Tracking processor 61 is a high speed digital processor, and receives 3D images from ladar sensor 60 based on infrared laser light reflected from the scene in the field of view which is coupled through receiving lens 62. Tracking processor 61 also receives positional reference data such as GPS from designating platform 39 and an internal inertial reference. Tracking processor 61 computes a new pointing vector based on data from its inertial and positional references and from 3D image data received from ladar sensor 60 and issues two sets of control commands. The first set of control commands has a low frequency (typically less than 10 Hz) and is sent to the motorized gimbal mount to keep the rotor pedestal 59 pointed in the direction of the landing zone 45 and landing target 46 generally along optical axis BB. The second set of commands issuing from tracking processor 61 goes to fast tracking mirror 66 which is used to make finer adjustments to the pointing vector of the designating laser 67 between angular limit lines 63 and 64. Electrically actuated fast tracking mirror 66 is capable of rapid (typically less than 1 kHz), small angular deflections in both azimuth and elevation angle in order to steer designator laser beam 42 through transmit lens 65 and accurately onto the landing target 46 and maintain it thereon. In a preferred embodiment, the designating laser 67 also serves as the pulsed laser transmitter 2 of the ladar sensor 60. In an alternate embodiment, ladar sensor 60 uses an external pulsed laser transmitter 68 instead of an internal pulsed laser transmitter 2 to illuminate the scene in the field of view of receiving lens 62 to produce the required 3D images of the landing zone 45 and landing target 46.

FIG. 10 illustrates a problem which may be overcome by proper application of the ladar sensor of the instant invention. A landing aircraft 73 with a ladar sensor 72 mounted on the landing aircraft 73 is unable to see the landing target 46 because it is obscured by aerosol cloud 70 which may be dust, fog, smoke, or other like obscurant. Both the illuminating laser beam 69 shown by an arrow and the reflected laser beam 71 must pass through aerosol cloud 70. Backscattering of pulsed laser light signals by the aerosol cloud 70 means the receiver section (4,5,6) of the ladar sensor could be stimulated with enough reflected light to cause the readout integrated circuit 4 unit cells to recognize the low level light pulses as a solid target, latching these results, which will be the range to various points on the cloud 70, and thereafter missing the target of real interest, the landing target 46 within landing zone 45. Though the helicopter "brownout" conditions are the focus of FIG. 10, this potential performance issue is the same as for an airplane approaching a runway in rainy or snowy conditions as well.

FIG. 11 gives a more complete picture of the performance issues related to partial obscuration of hard targets by aerosol clouds, leaves, branches, or other diffuse reflectors. Ladar sensor 74 sends out an illuminating laser pulse 78 in the direction of target 79 which produces a reflected portion 75 incident upon the receive optics 5 of the ladar sensor 74. First, however, the outgoing laser pulse encounters aerosol cloud 76. Having passed through aerosol cloud 76, it then encounters tree 77 which has small leaves sparsely interspersed on the tree 77 branches. At the bottom of FIG. 11, a distance plot (D) shows the magnitude and nature of the detected optical response of a typical pixel unit cell electrical circuit in the ladar sensor 74 receive section (4,5,6). The vertical axis ($V_R$) is a plot of the amplified unit cell analog output voltage in response to an optical input which has been detected by the associated avalanche photodiode of detector array 6. Because these responses are only detectable after a two-way round trip, the times of arrival of the reflected laser signals 75 are proportional to twice the distance, D. In region A of the lower diagram, only the electronic noise in the channel of a unit cell of readout integrated circuit 4 is visible. In region B, the diffused reflections from aerosol cloud 76 create low level responses which are slightly above the noise floor (shown in region "A"), yet potentially high enough to trigger the pulse recognition circuit associated with each unit cell of readout integrated circuit 4 if the reference threshold voltage $V_{CLAMP}$ is set low enough (just above the noise floor). This creates a dilemma for the system operator: if the pulse trigger reference threshold voltage $V_{CLAMP}$ is set low enough to create high sensitivity in order to detect distant objects, it may create a condition wherein nearby diffuse reflectors produce enough of a response to trigger the pulse recognition circuit. This is a common problem for radar and radio receivers, and is commonly dealt with by having the operator set a "squelch" variable adjustment knob. The "squelch" circuit is typically just an adjustable threshold in a difference amplifier, which works in much the same manner as the reference threshold voltage $V_{CLAMP}$ in the pulse recognition circuit common to each unit cell of the readout integrated circuit 4. Both circuits act to eliminate low level responses. However, it can be disadvantageous to raise the pulse trigger threshold reference voltage $V_{CLAMP}$ since it desensitizes the pulse recognition circuit. By inspection, a pulse trigger reference threshold voltage $V_{CLAMP}$ set high enough to eliminate the possibility of triggering on the clutter of detected signals reflected from the tree in region "C" of the diagram, would also eliminate any possibility of triggering the pulse recognition circuit within each unit cell electrical circuit on the response voltage 80 reflected from the real target 79. What is needed is the ability to discriminate between nearby diffuse reflectors and more distant hard targets, which can be distinguished by their abrupt reflections. This requirement can be achieved by using a range gate 81 to determine the nature of the voltage responses as shown in the lower half of FIG. 11. The range gate starts at a time $T_{GS}$, and lasts for period of time $T_{GW}$. Responses ($V_R$) from the unit cell electrical circuits which are read out through readout integrated circuit 4 which do not fall within the range gate time window between $T_{GS}$ and $T_{GS}+T_{GW}$ are ignored when the range gate is applied. The range gate 81 can be set arbitrarily short, but typically longer than the pulse width of pulsed laser transmitter 2. Each of the unit cells within readout integrated circuit 4 produces an analog output voltage, which is in turn sampled by a sample and hold circuit and analog to digital converter. Therefore, a "slice" of the 3D image space may be assembled at any point in time by associating all unit cell outputs taken at a given sample time, or range equivalent. Time samples of the whole 2D focal plane array through readout integrated circuit 4 are typically taken at 2.5 nanosecond intervals. Therefore, each 2.5 nanosecond "slice" of the 3D space in the field of view may typically correspond to less than 0.5 meter in depth. The range gate 81 may be a single slice or a number of slices superimposed as a composite, to increase the depth of the range gate 81. As the return voltages arrive, the range gate 81 is applied to the image slice or composite from readout integrated circuit 4, and the image analyzed. If the returns are coming from a diffuse reflector such as aerosol cloud 76, the image slice or composite image will show only a sparsely populated 2D matrix of single dots at ranges within region "B". This data can be associated due to the similarity in image densities as the range gate 81 moves further out in time, and in equivalent range, as an aerosol cloud because of the single dot nature of the image slices at each range gate 81 within region "B". Once the cloud is recognized, the range gate 81 may be moved out further in time and equivalent range until the responses from tree 77 are encountered. Because the leaves of tree 77 are much larger than the particles which typically may be suspended in an aerosol, larger clumps of dots, or pixels where the detected voltage response exceeds the pulse trigger reference threshold voltage $V_{CLAMP}$, are found in the image slice or composite image by the image analysis and bias control vector processor 8. The tree 77 may be recognized as an object by the association of multiple clumps of dots in the sequence of image slices from each range gate 81 as range gate 81 is moved further in time and equivalent range (to the right) in FIG. 11. The number of dots to be considered as a "clump", and their possible spatial relationships (polygon, wire, etc.) may be uploaded to image analysis and bias vector control processor 8 at system power up, or in real time as the visual environment changes. In the preferred embodiment, image analysis and bias control vector processor 8 is fast enough to do the image analysis required to recognize objects such as aerosol cloud 76 and tree 77 in real time, allowing for the detection of real target 79 on the first pulse from ladar sensor 74. However, in a lower power alternative embodiment of ladar sensor 74, sufficient real-time processing capability may not be available, and the process of walking the range gate 81 through the 3D space in time and distance may be done on a pulse-by-pulse basis. To consider the possibility of mapping out the full 3D space using a pulse-by-pulse scenario, and if the pulse rate of the ladar sensor pulsed laser transmitter 2 is 20 Hz, the full 3D range space of FIG. 11 might be mapped out in a matter of 10 seconds or less, if the range gate 81 is 10 feet wide and the hard target 79 is at a range of 2000 feet or less. Therefore, in the case of the lower power alternative embodiment, a pulse-by-pulse movement of range gate 81 through the 3D image space would, in the case of the scene of FIG. 11, preserve full functionality, since the interfering clutter in the form of aerosol cloud 76 and tree 77 is substantially static within the aforementioned 10 second time window.

Although the invention of the laser sensor for landing and approach has been specified in terms of preferred and alternative embodiments, it is intended the invention shall be described by the following claims and their equivalents.

What is claimed is:

1. A ladar sensor, comprising;
   a pulsed laser transmitter having an optical axis and a laser light output configured to produce a laser pulse,
   a digital controller adapted to initiate a laser pulse from said pulsed laser transmitter,
   transmit optics adapted to diffuse the pulsed laser light output and illuminate a scene in a field of view,
   receive optics boresighted along said optical axis and configured to collect an optical signal of pulsed laser light reflected from the scene in the field of view,
   a detector array comprising a plurality of light detecting pixels disposed to intercept the collected optical signal from said receive optics, and each of said light detecting pixels in said detector array intercepting a pixelated portion of said optical signal, and each light detecting pixel with an electrical output producing an electrical output signal,
   a plurality of unit cell electrical circuits, each unit cell electrical circuit with an input connected to one of said electrical outputs of a light detecting pixel, each unit cell electrical circuit having an amplifier connected to amplify one of the electrical output signals, each amplifier having a variable gain and a gain control input connected to a digital to analog converter output of said digital controller, and each unit cell electrical circuit with an output,
   a plurality of unit cell timing circuits, each of said unit cell timing circuits connected to a unit cell electrical circuit, each unit cell timing circuit initiated by a master start signal indicating the emission of the laser pulse, and each of said unit cell timing circuits having an output indicating the time of flight of the laser pulse,
   a unit cell timing termination circuit adapted to produce a termination signal which stops the counting of at least one of said unit cell timing circuits,
   and, a readout circuit adapted to read out the outputs of said unit cell electrical circuits and unit cell timing circuits.

2. The ladar sensor of claim 1 wherein said unit cell timing termination circuit is a pulse recognition circuit which indicates the detection of pulsed laser light reflected from a scene in the field of view.

3. The ladar sensor of claim 1 wherein said unit cell timing termination circuit produces a termination signal which is a range gate signal provided to all unit cell timing circuits.

4. The ladar sensor of claim 1 wherein said detector array is a two dimensional array of avalanche photodiodes residing on a common substrate.

5. The ladar sensor of claim 1 wherein said detector array is a two dimensional array of PIN photodiodes residing on a common substrate.

6. The ladar sensor of claim 1 wherein a control output of said digital controller is connected to the gain control input of said amplifier having a variable gain, and said digital controller and control output is adapted to produce a variable gain in said amplifier which increases with time.

7. A docking system comprising a first vehicle with a docking port and a second vehicle with a ladar sensor mounted thereon, said ladar sensor comprising;
   a pulsed laser transmitter having an optical axis and a laser light output configured to produce a laser pulse,
   a digital controller adapted to initiate a laser pulse from said pulsed laser transmitter,
   transmit optics adapted to diffuse the pulsed laser light output and illuminate a scene in a field of view,
   receive optics boresighted along said optical axis and configured to collect an optical signal of pulsed laser light reflected from the scene in the field of view,
   a detector array comprising a plurality of light detecting pixels disposed to intercept the collected optical signal from said receive optics, and each of said light detecting pixels in said detector array intercepting a pixelated portion of said optical signal, and each light detecting pixel with an electrical output producing an electrical output signal,
   a plurality of unit cell electrical circuits, each unit cell electrical circuit with an input connected to one of said electrical outputs of a light detecting pixel, each unit cell electrical circuit having an amplifier connected to amplify one of the electrical output signals, and each amplifier having a variable gain and a gain control input connected to a digital to analog converter output from said digital controller, and each unit cell electrical circuit with an output,
   a plurality of unit cell timing circuits, each of said unit cell timing circuits connected to a unit cell electrical circuit, and each unit cell timing circuit initiated by a master start signal indicating the emission of the laser pulse, and each of said unit cell timing circuits having an output indicating the time of flight of the laser pulse,
   a unit cell timing termination circuit adapted to produce a termination signal which stops the counting of at least one of said unit cell timing circuits, and
   a readout circuit adapted to read out a 3D image comprised of the outputs of said unit cell electrical circuits and unit cell timing circuits,
   and said second vehicle adapted to maneuver into an optimal docking position with said docking port by analyzing the 3D image.

8. The docking system of claim 7 wherein said unit cell timing termination circuit is a pulse recognition circuit which indicates the detection of pulsed laser light reflected from a scene in the field of view.

9. The docking system of claim 7 wherein said unit cell timing termination circuit produces a termination signal which is a range gate signal provided to all unit cell timing circuits.

10. The docking system of claim 7 wherein said detector array is a two dimensional array of avalanche photodiodes residing on a common substrate.

11. The docking system of claim 7 wherein said detector array is a two dimensional array of PIN photodiodes residing on a common substrate.

12. The docking system of claim 7 wherein said second vehicle is selected from the set of: a ship, spacecraft, a fixed wing aircraft, and a rotary wing aircraft.

13. A landing system comprising a landing vehicle having a ladar sensor mounted thereon, said ladar sensor comprising;
- a pulsed laser transmitter having an optical axis and configured to produce pulsed laser light output,
- a digital controller adapted to initiate a laser pulse from said pulsed laser transmitter,
- transmit optics adapted to illuminate a scene in the field of view of said ladar sensor with a pattern of light intensity,
- a master start signal indicating the emission of a laser pulse,
- receive optics boresighted along said optical axis and configured to collect an optical signal of pulsed laser light reflected from the scene in the field of view,
- a detector array comprising a plurality of light detecting pixels disposed to intercept the collected optical signal from said receive optics, and each of said light detecting pixels in said detector array intercepting a pixelated portion of said optical signal, and each light detecting pixel with an electrical output producing an electrical output signal,
- a plurality of unit cell electrical circuits, each unit cell electrical circuit with an input connected to one of said electrical outputs of a light detecting pixel, each unit cell electrical circuit having an amplifier connected to amplify one of the electrical output signals, each amplifier having a variable gain and a gain control input connected to a digital to analog converter output from said digital controller, and each unit cell electrical circuit with an output,
- a plurality of unit cell timing circuits, each of said unit cell timing circuits connected to a unit cell electrical circuit, each unit cell timing circuit initiated by a master start signal indicating the emission of the laser pulse, and each of said unit cell timing circuits having an output indicating the time of flight of the laser pulse,
- a unit cell timing termination circuit adapted to produce a termination signal which stops the counting of at least one of said unit cell timing circuits,
- a readout circuit adapted to read out a 3D image comprised of the outputs of said unit cell electrical circuits and unit cell timing circuits,
- and said landing vehicle adapted to maneuver into an optimal landing position on said landing zone by analyzing the 3D image.

14. The landing system of claim 13 wherein said unit cell timing termination circuit is a pulse recognition circuit which indicates the detection of pulsed laser light reflected from a scene in the field of view.

15. The landing system of claim 13 wherein said unit cell timing termination circuit produces a termination signal which is a range gate signal provided to all unit cell timing circuits.

16. The landing system of claim 13 wherein said detector array is a two dimensional array of avalanche photodiodes residing on a common substrate.

17. The landing system of claim 13 wherein said detector array is a two dimensional array of PIN photodiodes residing on a common substrate.

18. The landing system of claim 13 wherein said landing vehicle is selected from the set of: a spacecraft, a fixed wing aircraft, and a rotary wing aircraft.

* * * * *